(12) United States Patent
Ohashi

(10) Patent No.: US 10,532,287 B2
(45) Date of Patent: Jan. 14, 2020

(54) INFORMATION PROCESSING SYSTEM, COMPUTER-READABLE NON-TRANSITORY STORAGE MEDIUM HAVING INFORMATION PROCESSING PROGRAM STORED THEREIN, INFORMATION PROCESSING METHOD, AND INFORMATION PROCESSING APPARATUS

(71) Applicant: NINTENDO CO., LTD., Kyoto (JP)

(72) Inventor: Yuji Ohashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/269,746

(22) Filed: Feb. 7, 2019

(65) Prior Publication Data

US 2019/0262715 A1 Aug. 29, 2019

(30) Foreign Application Priority Data

Feb. 28, 2018 (JP) .................................. 2018-034842

(51) Int. Cl.
*A63F 13/58* (2014.01)

(52) U.S. Cl.
CPC ..................................... *A63F 13/58* (2014.09)

(58) Field of Classification Search
None
See application file for complete search history.

(56) References Cited

U.S. PATENT DOCUMENTS

| 9,526,985 | B2* | 12/2016 | Takayama | ............... A63F 13/49 |
| 2003/0022708 | A1 | 1/2003 | Yano et al. | |
| 2008/0287196 | A1 | 11/2008 | Miki et al. | |
| 2013/0054689 | A1* | 2/2013 | Woldman | ......... H04N 21/25866 709/204 |
| 2015/0005050 | A1* | 1/2015 | Takayama | ............... A63F 13/49 463/24 |

FOREIGN PATENT DOCUMENTS

| JP | 2003-010535 | 1/2003 |
| JP | 2008-264182 | 11/2008 |
| JP | 2014-150912 | 8/2014 |
| JP | 2014-188166 | 10/2014 |

* cited by examiner

*Primary Examiner* — Ronald Laneau
(74) *Attorney, Agent, or Firm* — Nixon & Vanderhye P.C.

(57) ABSTRACT

First, a first content selected from among owned contents owned by a user on the basis of an operation of the user is added to a group as a member of the group. Next, if it is possible to add a further member to the group as a result of adding the first content, a second content is added to the group from among unowned contents different from the owned contents. Then, a game in which the members of the group are used is executed.

20 Claims, 18 Drawing Sheets

Fig. 10
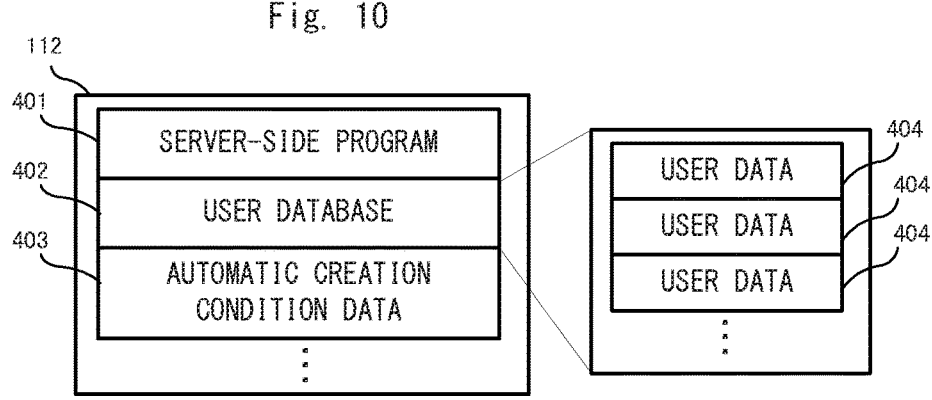
Fig. 11
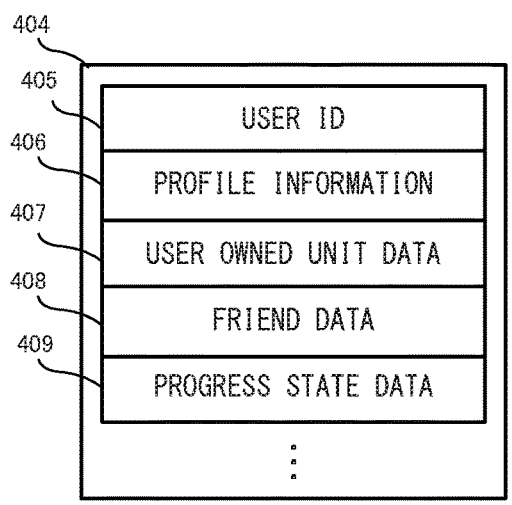
Fig. 12
| OWNED NUMBER | UNIT ID | CURRENT Lv | EQUIPPED SKILL | LEADER FLAG |
|---|---|---|---|---|
| 0001 | 00100 | 10 | ····· | OFF |
| 0002 | 00062 | 15 | ····· | ON |
| 0003 | 00032 | 8 | ····· | OFF |
| 0004 | 00005 | 30 | ····· | OFF |
| ⋮ | ⋮ | ⋮ | ⋮ | ⋮ |

| UNIT ID | IMAGE/SOUND DATA | INITIAL PARAMETER | PARAMETER DEFINITION DATA AT EACH LEVEL | COMBINATION EFFECT DEFINITION DATA |
|---|---|---|---|---|
| 0100 | .... | .... | .... | .... |
| 0101 | .... | .... | .... | .... |
| 0102 | .... | .... | .... | .... |
| 0103 | .... | .... | .... | .... |
| ⋮ | ⋮ | ⋮ | ⋮ | ⋮ |

| SORTIE ORDER (521) | UNIT DATA (522) |
|---|---|
| 1 | .... |
| 2 | .... |
| 3 | .... |
| 4 | .... |
| ⋮ | ⋮ |
| 20 | .... |

INFORMATION PROCESSING SYSTEM, COMPUTER-READABLE NON-TRANSITORY STORAGE MEDIUM HAVING INFORMATION PROCESSING PROGRAM STORED THEREIN, INFORMATION PROCESSING METHOD, AND INFORMATION PROCESSING APPARATUS

CROSS REFERENCE TO RELATED APPLICATION

The disclosure of Japanese Patent Application No. 2018-034842, filed on Feb. 28, 2018, is incorporated herein by reference.

FIELD

The exemplary embodiments relate to control of a game process executed in a game in which a group composed of a plurality of contents owned by a user is used.

BACKGROUND AND SUMMARY

Hitherto, a game has been known which is caused to proceed using a group organized by a plurality of characters that include a character selected by a user.

In the above-described game, a user who does not have a sufficient number of contents has an insufficient number of contents that can be added to a group, and thus cannot satisfactorily enjoy the game.

Therefore, it is an object of the exemplary embodiments to provide an information processing system, a computer-readable non-transitory storage medium having information processing program stored therein, and an information processing apparatus that are able to provide an opportunity of being able to satisfactorily enjoy a game to even a user who does not sufficiently own contents and thus cannot add contents to a group. Examples of the computer-readable non-transitory storage medium include magnetic media such as a flash memory, a ROM, and a RAM, and optical media such as a CD-ROM, a DVD-ROM, and a DVD-RAM.

In order to attain the object described above, for example, the following configuration examples are exemplified.

A configuration example is directed to a processing system comprising at least one processor, the at least one processor singly or in cooperation executing: adding at least one first content selected on the basis of an operation of the user from among owned contents owned by a user, to a group as a member of the group; filling up the group with at least one second content as a member of the group from among unowned contents not owned by the user if it is possible to add a further member to the group as a result of the adding; and executing a game in which the members of the group are used.

According to the above configuration example, as a result of addition of an owned content by a user operation, if it is possible to add a further member to the group, the user is allowed to add a content from the contents not owned by the user to the group as a member of the group and execute the game. Thus, it is possible to provide an opportunity of being able to satisfactorily enjoy the game to even a user who does not have a sufficient number of owned contents and thus cannot add sufficient contents to a group as members of the group.

In another configuration example, after the adding, if it is possible to add a further member to the group, the group may be automatically filled up with the second contents, whose number is equal to the number of contents that can be added, as members of the group from among the unowned contents.

According to the above configuration example, the user adds contents whose number is equal to the number of contents that can be added, to the group as members of the group from among the contents not owned by the user. Thus, the complexity of user operations for group organization is eliminated, and the convenience can be enhanced. For example, in a game in which all frames for organizing a group need to be filled, user operations for group organization are complicated. However, according to the above configuration example, contents whose number is equal to the number of contents that can be added are added to the group as members of the group from among the unowned contents after the user operation. Thus, the complexity of user operations for group organization is eliminated, and the convenience can be enhanced.

In another configuration example, after the adding, if it is possible to add a member to the group, the group may be automatically filled up with the second content as a member of the group from among the unowned contents according to a predetermined rule.

According to the above configuration example, contents whose number is equal to the number of contents that can be added are added to the group as members of the group from among the contents not owned by the user according to the predetermined rule, and thus the user can add the unowned contents to the group as members of the group without needing complicated operations. Accordingly, the burden of user operations for group organization can be alleviated, and the convenience can be enhanced.

In another configuration example, after the adding, if it is possible to add a member to the group, the group may be automatically filled up with the second content randomly selected from among the unowned contents as a member of the group.

According to the above configuration example, the user is allowed to add a content randomly selected from among the contents not owned by the user, to the group as a member of the group. Thus, the burden of user operations for group organization can be alleviated, and the convenience can be enhanced.

In another configuration example, if it is possible to add a further member to the group as a result of the adding, the second content may be created from among the unowned contents on the basis of a predetermined setting, and the group may be filled up with the second content as a member of the group.

According to the above configuration example, the user is allowed to create a content not owned by the user and add the content to the group as a member of the group. Thus, it is possible to provide an opportunity of being able to satisfactorily enjoy the game to even a user who does not have a sufficient number of owned contents and thus cannot add sufficient contents to a group as members of the group.

In another configuration example, if it is possible to add a further member to the group as a result of the adding, the second content may be created from among the unowned contents on the basis of a setting corresponding to the game to be executed, and the group may be filled up with the second content as a member of the group.

According to the above configuration example, a content not owned by the user can be created on the basis of a setting corresponding to the game, and the created content can be added to the group as a member of the group. Accordingly, it is possible to provide an opportunity of being able to satisfactorily enjoy the game to even a user who does not have a sufficient number of owned contents and thus cannot add sufficient contents to a group as members of the group. According to the present invention, as an example not limited to the above, it is possible to avoid a situation in which, in adding contents to a group as members of the group, when contents that are not selected by the user are added, for example, the added characters have low performance and thus the user cannot sufficiently enjoy the game. Accordingly, even when the number of contents owned by the user is small, or even when, for example, the performance of the contents is not sufficient to enjoy the game, it is possible to allow the user to enjoy the game.

In another configuration example, the first content may be added to the group as a member of the group with a state of the content prior to the adding being maintained.

According to the above configuration example, the user is allowed to add a content selected from the contents owned by the user, to the group as a member of the group with the state of the content prior to the addition to the group being maintained. Accordingly, a content selected by the user and added to the group as a member of the group can be used with the state of the content used so far being maintained. That is, a content with which the user is familiar can be used as is.

In another configuration example, if it is possible to add a further member to the group as a result of the adding, the group may be filled up with the second content as a member of the group from among unowned contents owned by another user.

According to the above configuration example, a content can be added to the group as a member of the group from among other contents owned by another user. Thus, it is possible to provide an opportunity of being able to satisfactorily enjoy the game to even a user who does not have a sufficient number of owned contents and thus cannot add sufficient contents to a group as members of the group.

In another configuration example, if it is possible to add a further member to the group as a result of the adding, the group may be filled up with the second content as a member of the group from among the unowned contents owned by another user associated with the user.

According to the above configuration example, a content can be added to the group as a member of the group from among contents owned by another user associated with the user. Thus, it is possible to provide an opportunity of being able to satisfactorily enjoy the game to even a user who does not have a sufficient number of owned contents and thus cannot add sufficient contents to a group as members of the group.

In another configuration example, if it is possible to add a further member to the group as a result of the adding, the group may be filled up with the second content as a member of the group from among a plurality of the unowned contents owned by a plurality of other users, respectively, associated with the user.

According to the above configuration example, contents owned by a plurality of other users associated with the user, for example, by so-called "friends", respectively, can be added to the group as members of the group. Thus, it is possible to provide an opportunity of being able to satisfactorily enjoy the game to even a user who does not have a sufficient number of owned contents and thus cannot add sufficient contents to a group as members of the group.

In another configuration example, the processing system may change a content setting such that a setting regarding the game for the second content with which the group is filled up as a member of the group from among the unowned contents is changed and then the second content is caused to appear in the executed game.

According to the above configuration example, a content added to the group as a member of the group can be caused to appear in the game after a setting regarding the game for the content is changed. Accordingly, it is possible to avoid a situation in which, in adding contents to a group as members of the group, when contents that are not selected by the user are added, for example, the added characters have low performance and thus the user cannot sufficiently enjoy the game.

In another configuration example, after the adding is completed, the second content is added to the group may be filled up with the second content as a member of the group from among the unowned contents before execution of the game is started.

According to the above configuration example, before execution of the game is started, a content can be added to the group as a member of the group from among contents owned by another user. Thus, it is possible to provide an opportunity of being able to satisfactorily enjoy the game to even a user who does not have a sufficient number of owned contents and thus cannot add sufficient contents to a group as members of the group. In addition, for example, after a content owned by the user is added, another content is added to the group as a member of the group, and the game can be immediately started. Thus, the complexity of operations of the user can be reduced.

In another configuration example, if it is possible to add a further member to the group as a result of the adding, the group may be filled up with the second content as a member of the group from among the unowned contents, and the contents included in the group after the addition may be presented to the user before execution of the game is started.

According to the above configuration example, when a content is added to the group as a member of the group from among contents owned by another user, the added content can be presented to the user. Accordingly, it is possible to allow the user to confirm another content that is not selected by the user and added to the group as a member of the group, before the game is started.

In another configuration example, the first content selected from among the owned contents owned by the user and the unowned contents on the basis of an operation of the user may be added to the group as a member of the group.

According to the above configuration example, the user is allowed to add not only a content owned by the user but also an unowned content not owned by the user, to the group as members of the group on the basis of an operation of the user. Accordingly, it is possible to provide an opportunity of being able to satisfactorily enjoy the game to even a user who does not have a sufficient number of owned contents and thus cannot add sufficient contents to a group as members of the group.

In another configuration example, the first content selected on the basis of an operation of the user from among the owned contents owned by the user and the unowned contents owned by another user associated with the user, may be added to the group as a member of the group.

According to the above configuration example, the user is allowed to add not only a content owned by the user but also an unowned content owned by another user associated with the user, to the group as members of the group on the basis of an operation of the user. Accordingly, it is possible to provide an opportunity of being able to satisfactorily enjoy the game to even a user who does not have a sufficient number of owned contents and thus cannot add sufficient contents to a group as members of the group.

In another configuration example, at least two contents, as the first content selected on the basis of an operation of the user from among the owned contents owned by the user and a plurality of the unowned contents owned by a plurality of the other users, respectively, associated with the user, may be added to the group as members of the group.

According to the above configuration example, a plurality of contents selected on the basis of an operation of the user from among owned contents owned by the user and a plurality of unowned contents owned by a plurality of other users associated with the user (for example, so-called friends), respectively, can be added to the group as members of the group. Thus, it is possible to provide an opportunity of being able to satisfactorily enjoy the game to even a user who does not have a sufficient number of owned contents and thus cannot add sufficient contents to a group as members of the group.

In another configuration example, the at least one processor may change a setting in the game, in accordance with a setting of appearance order in which an order in which the contents included in the group appear in the executed game is set, and a combination of the contents that are caused to appear in the game, such that the setting in the game is advantageous for the user; the at least one processor may determine whether a content appearing in the game has satisfied a leaving condition for leaving from the game; and when the content that has satisfied the leaving condition is caused to leave from the game, the at least one processor may cause the content included in the group to appear in the game according to the order and execute the game in which the content is used.

According to the above configuration example, when a predetermined appearance condition is satisfied, the contents included in the group may be caused to appear in the game according to an order. Thus, it is possible to provide the incentive to add contents to the group as members of the group in consideration of an order, to the user. For example, in a game in which groups fight against each other, a user is allowed to organize a group in consideration of an order in which contents appear. In addition, when a condition for a content leaving from the game is satisfied, the contents included in the group may be caused to appear in the game according to an order. Thus, it is possible to provide the incentive to add contents to the group as members of the group in consideration of an order, to the user. For example, in a simulation game in which groups fight against each other, when a user-side content is eliminated by an opponent, a content can be caused to appear from among reserve contents according to a predetermined order. Thus, the user is allowed to organize a group in consideration of an appearance order. Moreover, depending on a combination of contents caused to appear in the game, a setting in the game is changed such that the setting is advantageous for the user. Thus, it is possible to provide the incentive to add contents to the group as members of the group in consideration of contents to be added and an order in which the contents appear in the game, to the user. Accordingly, it is possible to allow the user to enjoy group organization with consideration of a combination of contents, and it is possible to enhance the strategic characteristics of the game and further enhance the entertainment characteristics of the game.

According to the present embodiment, after an owned content owned by the user is added to the group as a member of the group, if it is possible to add a further member to the group, a content not owned by the user, for example, a content owned by another user associated with the user, can be added. Thus, it is possible to provide an opportunity of enjoying the game to a user who does not sufficiently own contents and thus cannot add contents to the group.

BRIEF DESCRIPTION OF THE DRAWINGS

FIG. 10 shows a non-limiting example of data stored in a memory 112 of the server 101

FIG. 11 shows a non-limiting example of the data configuration of user data 404;

FIG. 12 shows a non-limiting example of the data configuration of user owned unit data 407;

FIG. 15 shows a non-limiting example of the data configuration of own military team troop data 503;

DETAILED DESCRIPTION OF NON-LIMITING EXAMPLE EMBODIMENTS

Figure 1:
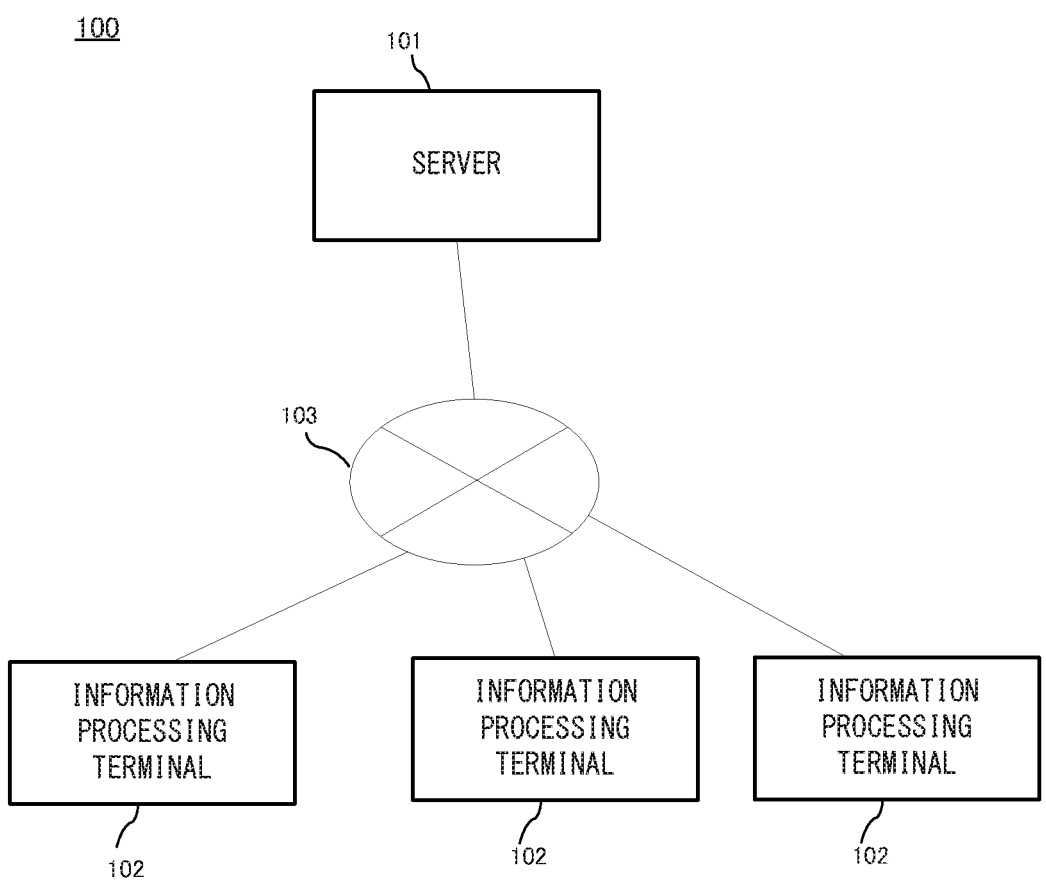
FIG. 1 is a schematic diagram showing the whole image of an information processing system which is a non-limiting example of an embodiment.

Hereinafter, one exemplary embodiment will be described. It is to be understood that as used herein, elements and the like written in a singular form with a word "a" or "an" attached before them do not exclude those in a plural form. FIG. 1 is a schematic diagram showing the whole image of an information processing system according to the present embodiment. The information processing system 100 of the present embodiment includes a server 101 and a plurality of information processing terminals 102. The server 101 and each information processing terminal 102 are configured to be able to communicate with each other via the internet 103. In the present embodiment, with such a configuration, an information process is executed. Hereinafter, a description will be given with a game process as an example of the information process. Specifically, a game process for which a game program is installed on the information processing terminal 102 and which is executed while communication with the server 101 is being performed as necessary, will be described as an example.

[Hardware Configuration of Server]

Figure 2:
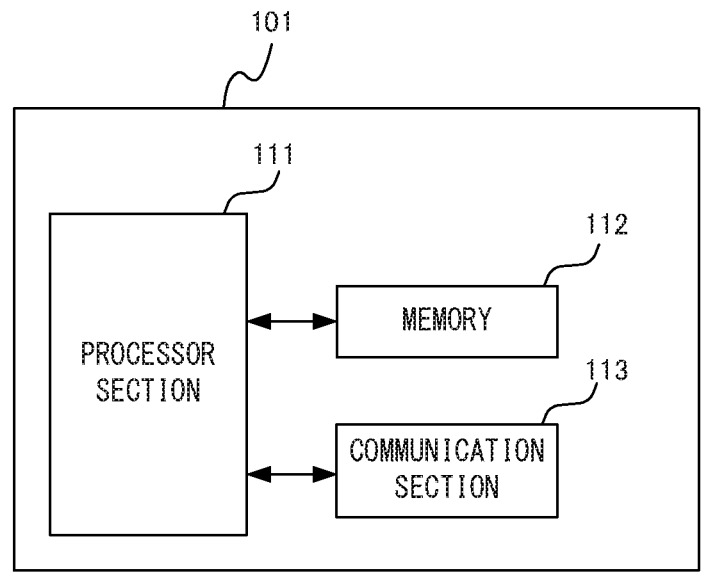
FIG. 2 is a block diagram showing the hardware configuration of a server 101.

Next, the hardware configuration of the server 101 will be described. FIG. 2 is a block diagram showing the hardware configuration of the server 101. The server 101 includes at least a processor section 111, a memory 112, and a communication section 113. The processor section 111 executes various programs for controlling the server 101. In the memory 112, various programs to be executed by the processor section 111 and various kinds of data to be used by the processor section 111 are stored. The communication section 113 connects to a network by means of wired or wireless communication and transmits/receives predetermined data to/from each information processing terminal 102 or another server (not shown).

[Hardware Configuration of Information Processing Terminal]

Figure 3:
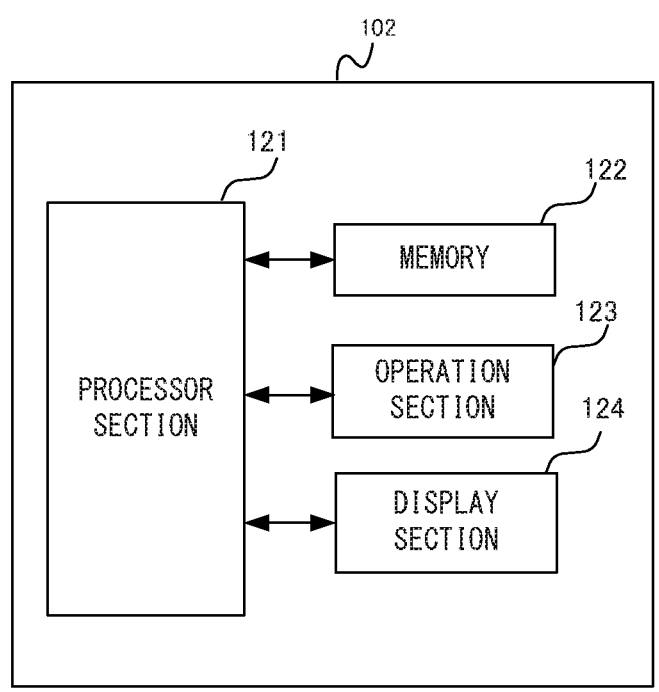
FIG. 3 is a block diagram showing the hardware configuration of an information processing terminal 102.

FIG. 3 is a block diagram showing the hardware configuration of an information processing terminal 102 which executes a game process according to the present embodiment. Here, in the present embodiment, for example, a smart device such as a smartphone and a tablet, a game apparatus such as a stationary game apparatus and a hand-held game apparatus, a personal computer, or the like is assumed as the information processing terminal 102. In the description of the present embodiment, an information processing terminal (for example, a smartphone) including a display screen and a touch panel that are integrated with each other will be described as an example. Therefore, input operations are mainly inputs to the touch panel. However, in another exemplary embodiment, for input operation, a physical controller connected to an information processing terminal wirelessly or via wire may be employed, or for example, an input apparatus formed integrally with the information processing terminal may be employed.

In FIG. 3, the information processing terminal 102 includes a processor section 121, a memory 122, an operation section 123, and a display section 124. The processor section 121 executes a later-described game process or executes a system program (not shown) for controlling overall operation of the information processing terminal 102, thereby controlling operation of the information processing terminal 102. The processor section 121 may include a single processor or a plurality of processors. In the memory 122, various programs to be executed by the processor section 121 and various kinds of data to be used in the programs are stored. The memory 122 is, for example, a flash EEPROM or a hard disk device. The operation section 123 is an input device for receiving an operation from a user, and in the present embodiment, a touch panel is mainly assumed as the operation section 15. In another exemplary embodiment, the operation section 123 may be various pointing devices, various press-type buttons, an analog stick, and the like. The display section 124 is typically a liquid crystal display device.

[Outline of Game Process of Present Embodiment]

Next, an outline of the game process executed in the present embodiment will be described. In the present embodiment, a turn-based strategy type simulation game (hereinafter, referred to as TBSG) is assumed. In addition, in the present embodiment, a TBSG in which an own military team and an enemy military team, that is, two military teams in total, fight against each other is assumed. In the TBSG, a "unit" owned by a user is used as a piece in the simulation game. In the present embodiment, a unit "owned" by a user refers to a unit associated with the user on data, that is, a unit associated with a predetermined user as an "owner" on data. A method for acquiring a unit will be described later.

[Configuration of Game Screen]

Figure 4:
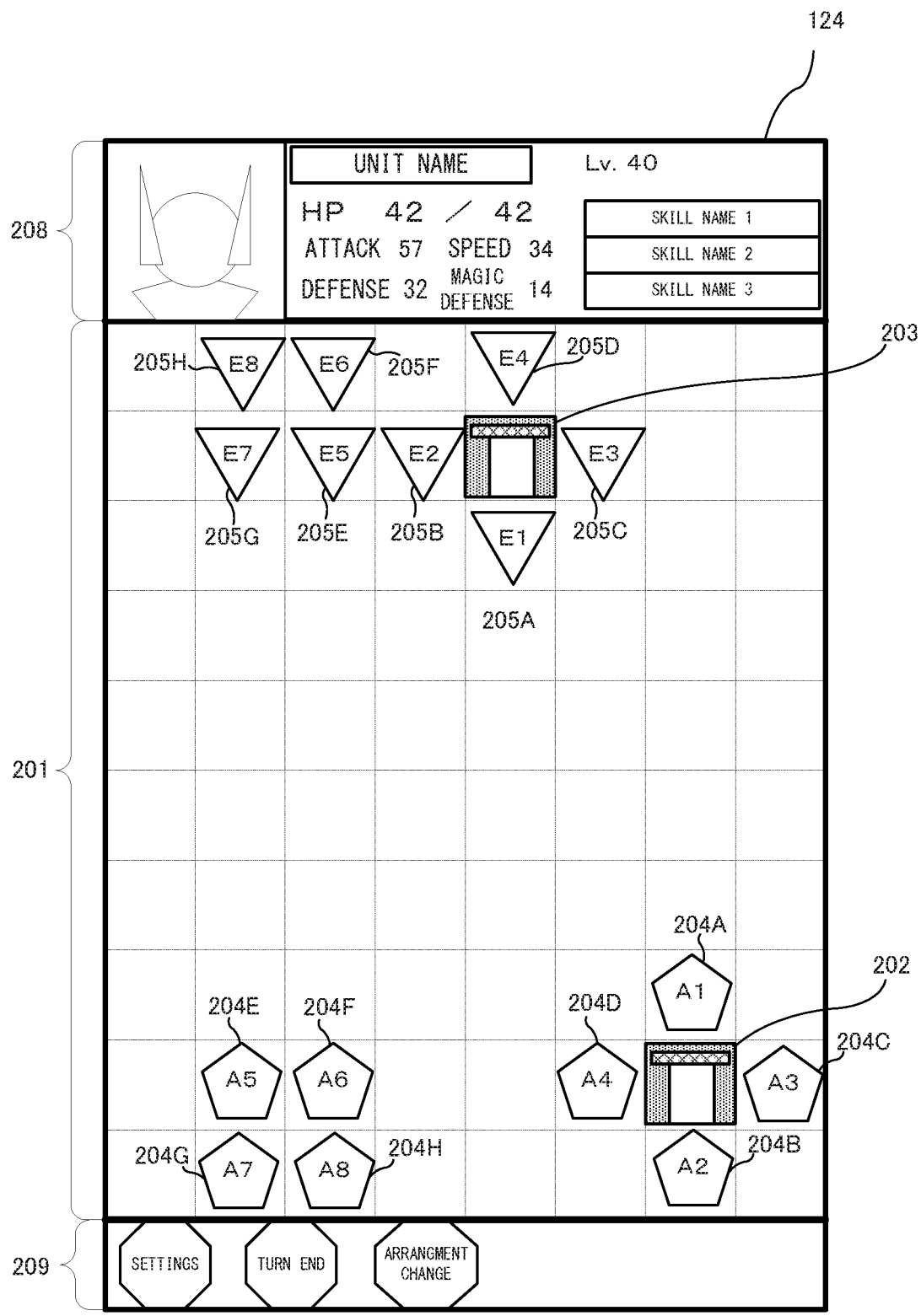
FIG. 4 shows a non-limiting example of a game screen.

FIG. 4 shows an example of a game screen for a TBSG process according to the present embodiment. In FIG. 4, in a game screen displayed on the display section 124, a map 201 composed of 8×10 cells is prepared as a "map" that serves as a game field. Although not shown, the attributes of various kinds of terrain such as a "plain", a "mountain", a "forest", and a "river" are set for the respective cells. In addition, on the map 201, an own military team base 202 and an enemy military team base 203 are arranged. The own military team base 202 is located near the lower edge of the map 201, and the enemy military team base 203 is located near the upper edge of the map 201. Moreover, eight own military team units 204A to 204H are arranged as units of the own military team near the lower edge of the map 201 (hereinafter, sometimes collectively referred to as own military team units 204). In the drawing, in order to identify each own military team unit 204, identifiers "A1" to "A8" are assigned to the respective units. Furthermore, in the drawing, each own military team unit 204 is represented as a pentagonal unit, but an appearance image corresponding to the view of a world in the game is displayed in an actual game screen. For example, in the case of a TBSG in which a Medieval Europe-like fantasy world is set, appearance images of various characters such as foot soldiers, cavalries, archers, and wizards may be displayed as images of units.

As units of the enemy military team, eight enemy military team units 205A to 205H are arranged near the upper edge of the map 201 (hereinafter, sometimes collectively referred to as enemy military team units 205). Similar to the above, in the drawing, in order to identify each enemy military team unit 205, identifiers "E1" to "E8" are assigned to the respective enemy military team units 205. In this drawing, each enemy military team unit 205 is represented as a triangular unit, but, similar to the above, for example, appearance images of various characters may be displayed in an actual game screen.

Above the map 201, a detailed information portion 208 indicating unit detailed information such as the status of any unit selected though a tap operation, is also displayed. In addition, below the map 201, a menu portion 209 presenting buttons for various commands that can be used for progress of the game, is also displayed. For example, a turn end button for ending an own turn, etc., are displayed in the menu portion 209.

In the present embodiment, the own military team and the enemy military team each have 20 units. In the following description, a set of the 20 units is referred to as a "troop". That is, in the TBSG of the present embodiment, groups each called a "troop" composed of 20 units fight against each other (a process of organizing the "troops" will be described later). In addition, at most, eight units can be simultaneously present on the map 201 for each of the own military team and the enemy military team. In this example, at start of the game, eight units are arranged as initial members at initial positions. Then, when any of the eight initial members is eliminated, a unit selected in a predetermined order (described later) from among the unarranged remaining units (hereinafter, reserve units) is arranged on the map 201 such that an upper limit for the number of units that can be simultaneously present is eight as described above. Hereinafter, arranging a unit from among the reserve units on the map 201 as described above is referred to as "unit supplementation". Regarding a position at which a unit is arranged as a supplement, the unit is arranged according to the following priority, for example. First, the unit is arranged on the own military team base 202 as an arrangement position having the highest priority. When the number of units to be arranged as supplements is only one, the supplementation is completed at this stage. When the number of units to be arranged as supplements is two to five, the units are arranged on four cells, that is, the upper, lower, right, and left cells, adjacent to the own military team base 202, for example, in clockwise order. Furthermore, when the number of units to be arranged as supplements is six to eight, the units are arranged on the upper left, upper right, and lower right cells with respect to the own military team base 202 after the arrangement on the four cells that are the upper, lower, right, and left cells.

In this example, an example in which each troop is composed of "20" units and the number of units that can be simultaneously present on the map 201 is eight, has been described, but it is needless to say that the number of units in each troop and the number of units that can be simultaneously present on the map are not limited to these values.

Here, a supplemental description for the method for acquiring a unit in the TBSG according to the present embodiment will be given. In the TBSG, the view of a fantasy world is assumed. In addition, the units are "characters" that are characters appearing in this world view. In addition, in the initial state, for example, in a state immediately after a user buys a product package of the TBSG, the user does not own any "character". In the TBSG, a type of game mode that is referred to as a "story mode" and in which a predetermined scenario is caused to proceed is prepared. In accordance with progress of a story, a TBSG process is performed as appropriate using a map associated with the scenario. Then, in accordance with progress of the story, it is possible to acquire predetermined "characters", that is, units, as "companions" of the user. The "characters" are prepared as various types of units such as foot soldiers, wizards, cavalries, and archers.

In addition to the "story mode", a game mode called an "event mode" is present. This mode is, for example, a TBSG in which a predetermined map prepared by an administrator is used, and it is possible to acquire a predetermined unit as a clearance reward when the map is cleared. In addition, it is possible for the user to acquire units through distribution of predetermined characters to all users, for example, as "characters distributed from the administrator". Furthermore, in the TBSG, it is also possible to acquire a unit by a means called "Gacha" (a lottery-like game for acquiring an item). It is possible for the user to acquire a randomly selected unit by doing charged or free Gacha. Thus, users who play the TBSG can have different numbers of owned characters or different contents thereof.

In the TBSG described in the present embodiment, a TBSG process in the above "event mode" is mainly assumed. For example, the map shown in FIG. 4 described above is distributed from the server 101 for a limited period, and the TBSG in which this map is used can be played only in this period.

The TBSG of the present embodiment is a game that is played using units acquired by the user by various acquiring methods as described above. That is, the user acquires various units by playing the above "story mode" or "event mode" or doing "Gacha". Furthermore, a "troop" is organized using units acquired as described above and is caused to "sortie" to the above map 201. Then, the game is caused to proceed by causing each unit to fight against an enemy military team unit by operating the unit. For each unit, statuses such as a movement range, a HP, attacking power, skills (for example, magic, techniques, etc.), and rarity are set. Moreover, in the TBSG according to the present embodiment, each unit is defined to have a growth factor. Specifically, a concept of "level" is defined, the level of a unit is raised by repeatedly fighting, and parameter values (a specific value of each status, etc.) of the unit are also raised with the rise in level. Furthermore, for example, a new skill is acquired with the rise in level. Then, in the TBSG of the present embodiment, achievement of a victory condition is aimed while the units are fighting against each other. In the present embodiment, the enemy military team units 205 are controlled by the processor section 121. That is, a description will be given with, as an example, the case where one user plays the TBSG.

In the TBSG according to the present embodiment, there are the following two conditions as victory conditions.

<Victory condition 1> To seize the enemy military team base within 10 turns.

<Victory condition 2> To be determined as "superior" as a result of evaluation of actions made so far after 10 turns.

That is, in the TBSG of the present embodiment, the game is ended when 10 turns have elapsed. Thus, if the enemy military team base 203 is seized within 10 turns, a "victory" is secured at that time. On the other hand, if the enemy military team base 203 is not seized even when 10 turns have elapsed, the contents of actions made so far and the battle situation at that time are evaluated, and whether the own military team is "superior" or "inferior" to the enemy military team is determined. For example, whether the own military team is "superior" or "inferior" to the enemy military team is determined, for example, by using the number of enemy military team units 205 eliminated and the number of own military team units 204 eliminated.

Defeat conditions are opposite to the above victory conditions and are the following conditions.

<Defeat condition 1> The own military team base being seized within 10 turns.

<Defeat condition 2> To be determined as "inferior" as a result of evaluation of actions made so far after 10 turns.

The determination as to a victory/defeat is not limited to the above. For example, in another exemplary embodiment, the above <victory condition 1> and <defeat condition 1> are handled as conditions for ending the game before 10 turns have elapsed, and a "victory" or a "defeat" may be determined by performing superior/inferior determination at that time. In this case, for example, the own military team seizes the enemy military team base earlier, but as a result of superior/inferior determination including this fact, it can be determined as "inferior", resulting in a "defeat".

Regarding a method for seizing the enemy military team base 203, the enemy military team base 203 can be seized by attacking the enemy military team base 203 three times in the present embodiment. In addition, as a reverse of this, the own military team base 202 is seized by the enemy military team when the own military team base 202 is attacked three times.

The TBSG of the present embodiment has a gimmick that is a "combination effect" that an advantageous effect is exercised depending on a combination of units. For example, in a state where a "cavalry A" and a "cavalry B" are simultaneously present on the map 201, the unit performance of both the "cavalry A" and the "cavalry B" is increased from normal performance. In addition, for example, in a state where two specific units that are set as best friends or lovers are simultaneously present on the map 201, the unit performance of both of the two specific units is increased from normal performance. Thus, the order in which units are caused to appear on the map 201 is an important factor in terms of progress of the game, and further enhances the strategic characteristics of the game. In addition, regarding troop organization described below, it is possible to provide, to the user, the enjoyment of performing operations for troop organization while also considering such an order in which units are caused to appear.

[Troop Organization]

Next, an outline of operations and an organization screen for organizing the above-described "troop" of the own military team will be described. As described above, the TBSG of the present embodiment is played using a troop composed of 20 units. Thus, before start of the game, the user needs to organize a troop that is to be caused to sortie. Then, in the present embodiment, the user can organize a troop using units owned by the user (hereinafter, user owned units). Furthermore, in the present embodiment, it is also possible to organize a troop using units not owned by the user (hereinafter, user unowned units). The user unowned units refer to general units that are not owned by the user. In the present embodiment, a description will be given with later-described "friend units" and "automatic creation units" as examples of the user unowned units. In another exemplary embodiment, units other than these units may be used as long as the units are not owned by the user.

Figure 5:
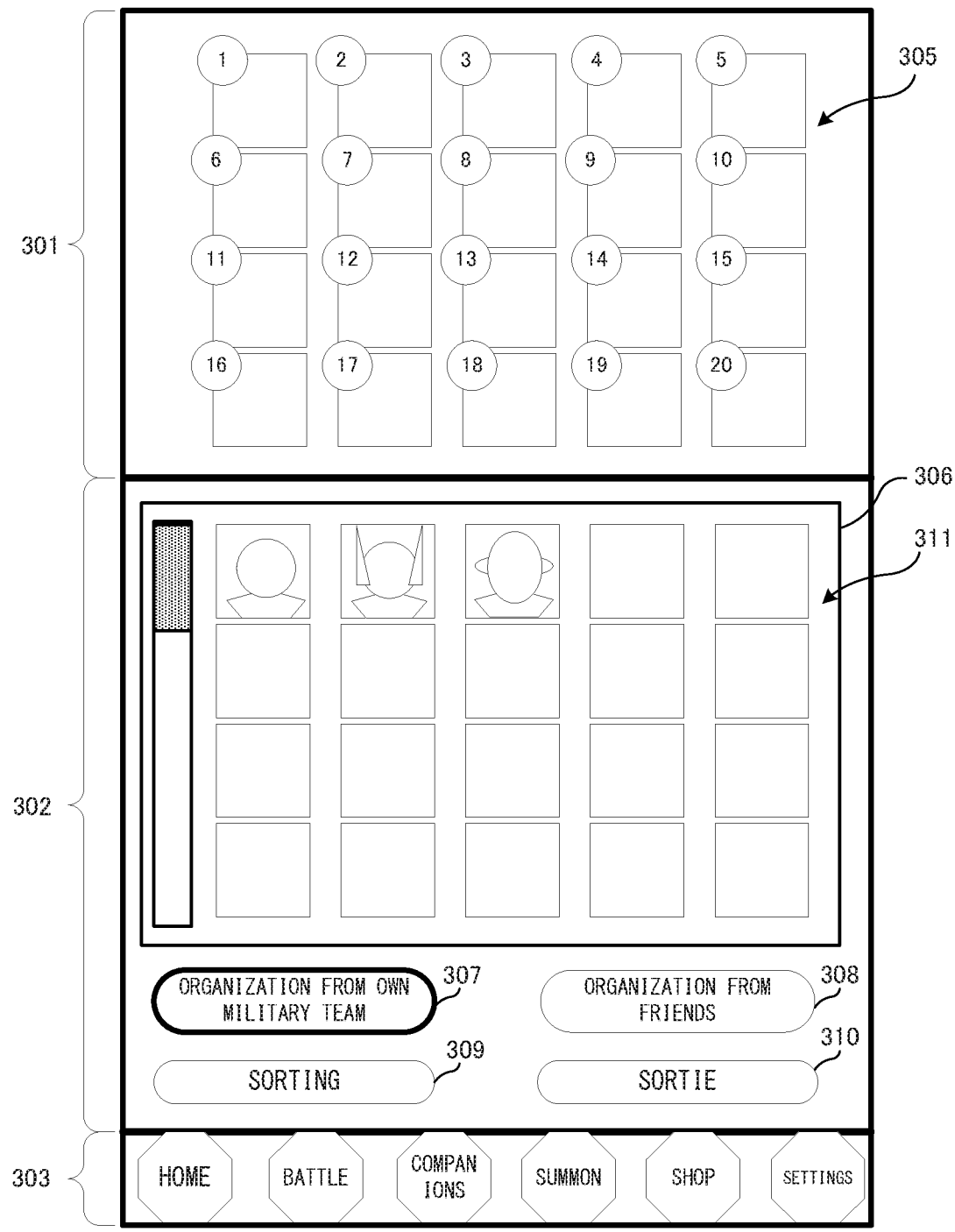
FIG. 5 shows a non-limiting example of a troop organization screen.

In the present embodiment, before an actual TBSG process is started, a process for troop organization using a troop organization screen is performed. FIG. 5 shows an example of a screen for troop organization. In the screen example shown in FIG. 5, a troop frame screen 301 is displayed in substantially the upper half of the display section 124, a selection screen 302 is displayed below the troop frame screen 301, and an organization menu portion 303 in which buttons for various commands are displayed is also displayed below the selection screen 302.

In the troop frame screen 301, 20 troop frames 305 are displayed in total in five columns×four rows. In addition, numbers from 1 to 20 indicating the order of appearance on the map 201 (hereinafter, sortie order) are also displayed at upper left portions of the respective troop frames 305. Basic operations on this screen are operations performed by tapping unit images, displayed in a list in the selection screen 302, such that the troop frames 305 in the troop frame screen 301 are sequentially filled according to the sortie order. However, it is also possible to organize a troop using a function of "automatic organization", which will be described in detail later, without performing such operations. Hereinafter, troop organization based on tap operations of the user is referred to as "manual organization", and troop organization using the automatic organization function described later is referred to as "automatic organization".

Figure 6:
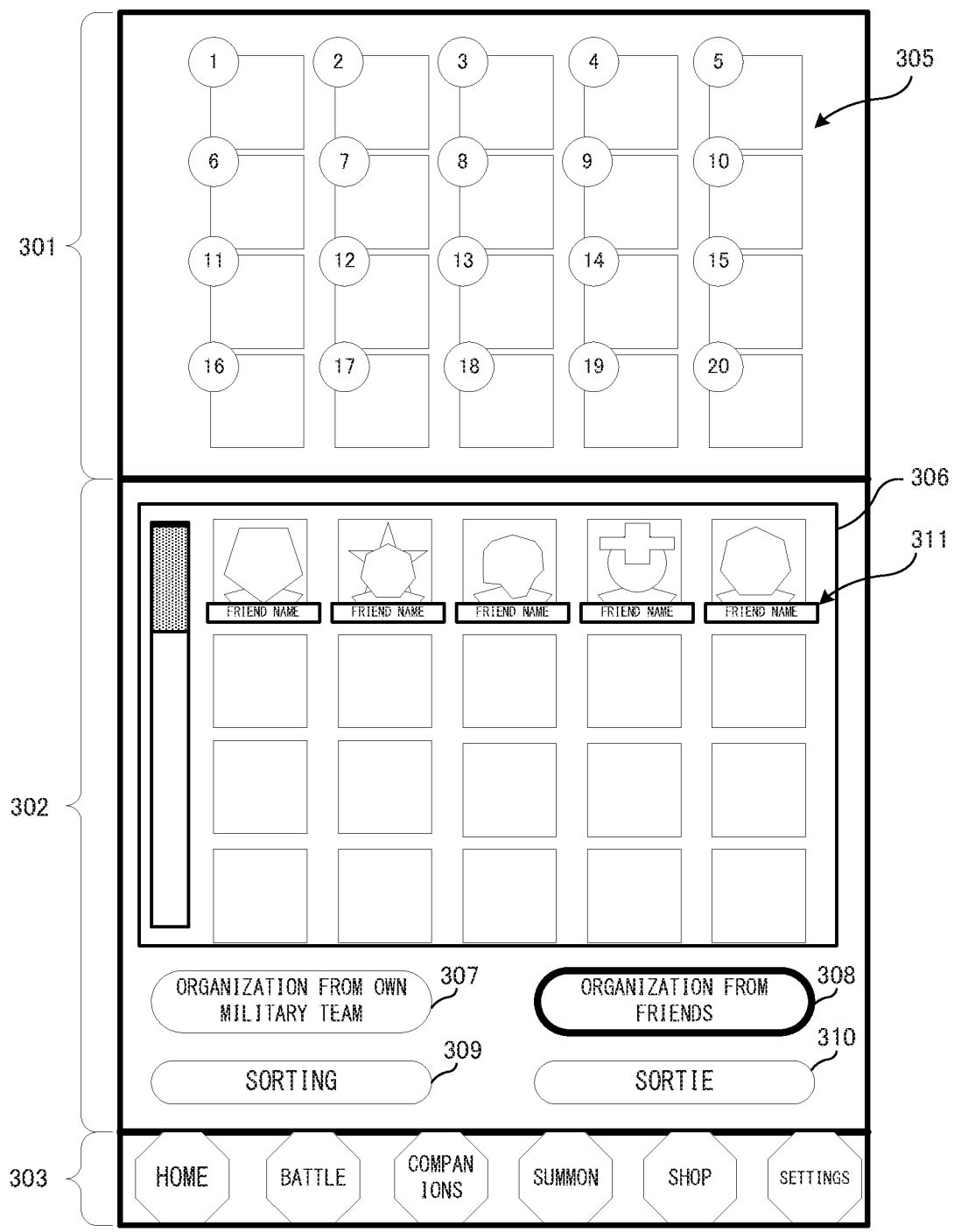
FIG. 6 shows a non-limiting example of a troop organization screen.

In the selection screen 302, a unit list display portion 306, an "organization from own military team" button 307 (hereinafter, referred to as own military team organization button), an "organization from friends" button 308 (hereinafter, referred to as friend organization button), a sorting button 309, and a sortie button 310 are displayed. The unit list display portion 306 is a display region for displaying, in a list, images of units that can be organized into a troop, and a plurality of frames 311 are displayed therein. In addition, this region can be scrolled up or down by using a scroll bar disposed in a left edge portion. Contents displayed in the unit list display portion 306 can be switched by using the own military team organization button 307 and the friend organization button 308. Specifically, when the user performs a tap operation on the own military team organization button 307, the units owned by the user, that is, the above user owned units, are displayed in the unit list display portion 306. Meanwhile, when the user taps the friend organization button 308, images of some of units owned by other users who have a friend relationship with the user, specifically, images of units set as leader units described later, (hereinafter, referred to as friend units) are displayed as shown in FIG. 6. In the initial state, the user owned units are displayed in the unit list display portion 306. In addition, when the sorting button 309 is tapped, a "sorting mode" is entered, and the user can change the sortie order of the units by performing drag operations or the like on the troop frame screen 301. When the sortie button 310 is tapped, the process for organization is ended, and a TBSG process using the map 201 shown in FIG. 4 described above is started.

Here, a supplemental description of the above friends and the above leader units will be given. In the TBSG according to the present embodiment, the user can resister a plurality of other users as so-called "friends". Information about the friends may be stored in the server 101 as a "friend list" so as to be associated with the user, or may be stored in the information processing terminal 102. In the present embodiment, in organizing the above "troop", it is possible to organize not only the user owned units but also the friend units into the troop. In other words, the user can freely organize a troop by using, in addition to the user owned units, the friend units owned by other users who have a predetermined relationship with the user (friends in the present embodiment).

Next, the leader units will be described. Each leader unit is a unit that is set as a "leader" among units owned by a user. A user can set only one of the owned units as a leader. In the unit list display portion 306, the units that are set as leader units are displayed. For example, when the number of friends is five, five units that are set as leader units by the respective friends are displayed in the unit list display portion 306 as shown in FIG. 6 described above. In FIG. 6, the five units are displayed in a state where the five frames 311 in the uppermost row in the unit list display portion 306 are filled. In addition, below each frame, the name of the friend who owns the unit in this frame is also displayed, so that it is possible to recognize which friend owns each unit.

As described above, the "troop" in the present embodiment can be organized using both a plurality of user owned units and a plurality of friend owned units. This is different from the case of borrowing a character of a friend and setting the character in a so-called "helper frame" or "friend frame". For example, a game in which, for a party that is caused to take part in a certain battle, four characters are selected from among characters owned by a user and one character of a friend is also selected, has also been known. In such a game, a frame in which a character of a friend is to be set and frames in which characters owned by the user are to be set are clearly distinguished and handled. On the other hand, for the "troop" in the present embodiment, a user owned unit can be set or a friend unit can be set in each of all the frames. For example, when 20 or more friends are present, it is possible to organize a troop composed of only friend units.

[Manual Organization]

Figure 7:
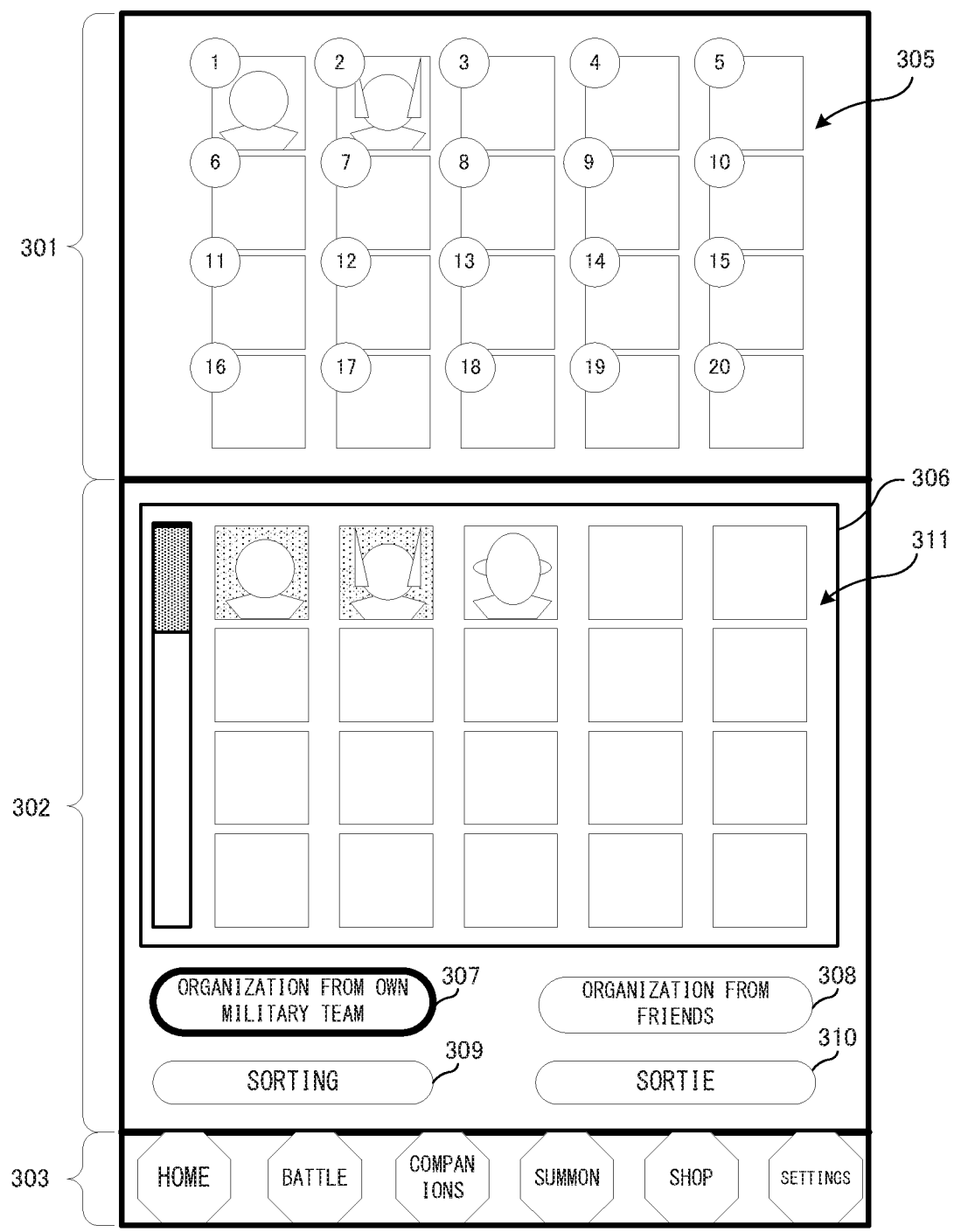
FIG. 7 shows a non-limiting example of a troop organization screen.

Next, flow of manual organization and an example of a screen accompanying the manual organization will be described. Here, as an example, operations for adding two of the user owned units to a troop and then adding four friend units to the troop will be described. First, in a state where a list of user owned units (only three units in this example) is displayed in the unit list display portion 306 as shown in FIG. 5 described above, the user performs a tap operation on the uppermost and leftmost frame 311 in the unit list display portion 306. Accordingly, the first unit is displayed as a member in the uppermost and leftmost troop frame 305 in the troop frame screen 301, that is, in the troop frame 305 that is the "first" in the sortie order. Subsequently, when the user performs a tap operation on the second unit displayed in the frame 311 located to the right of the previously selected frame, this unit is displayed as a member in the troop frame 305 that is the "second" in the sortie order. In the unit list display portion 306, the display forms of the frames of the selected units may be changed so as to indicate that the units have been selected. FIG. 7 shows an example of a screen in a state where only two of the user owned units have been added to the troop as described above.

Figure 8:
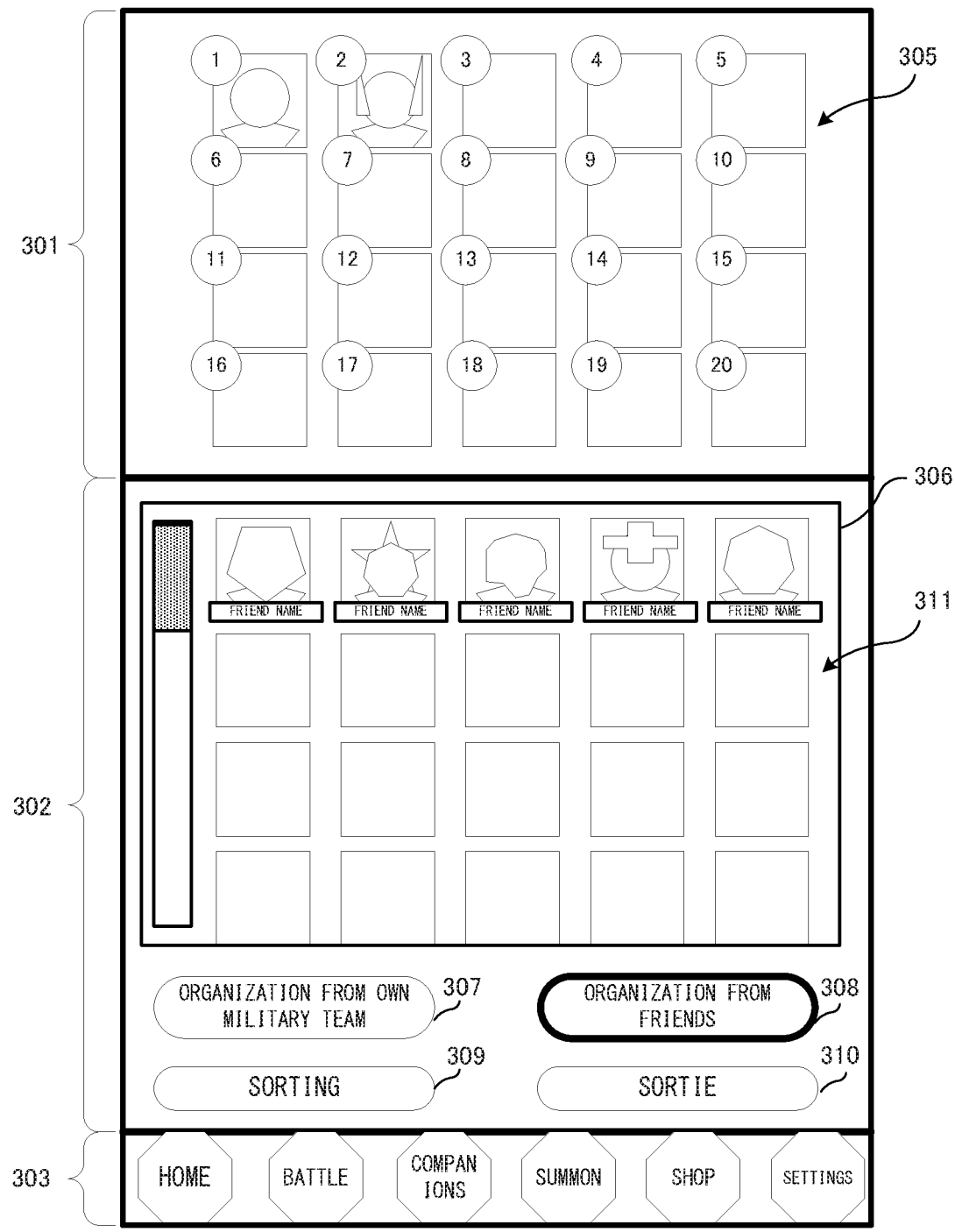
FIG. 8 shows a non-limiting example of a troop organization screen.
Figure 9:
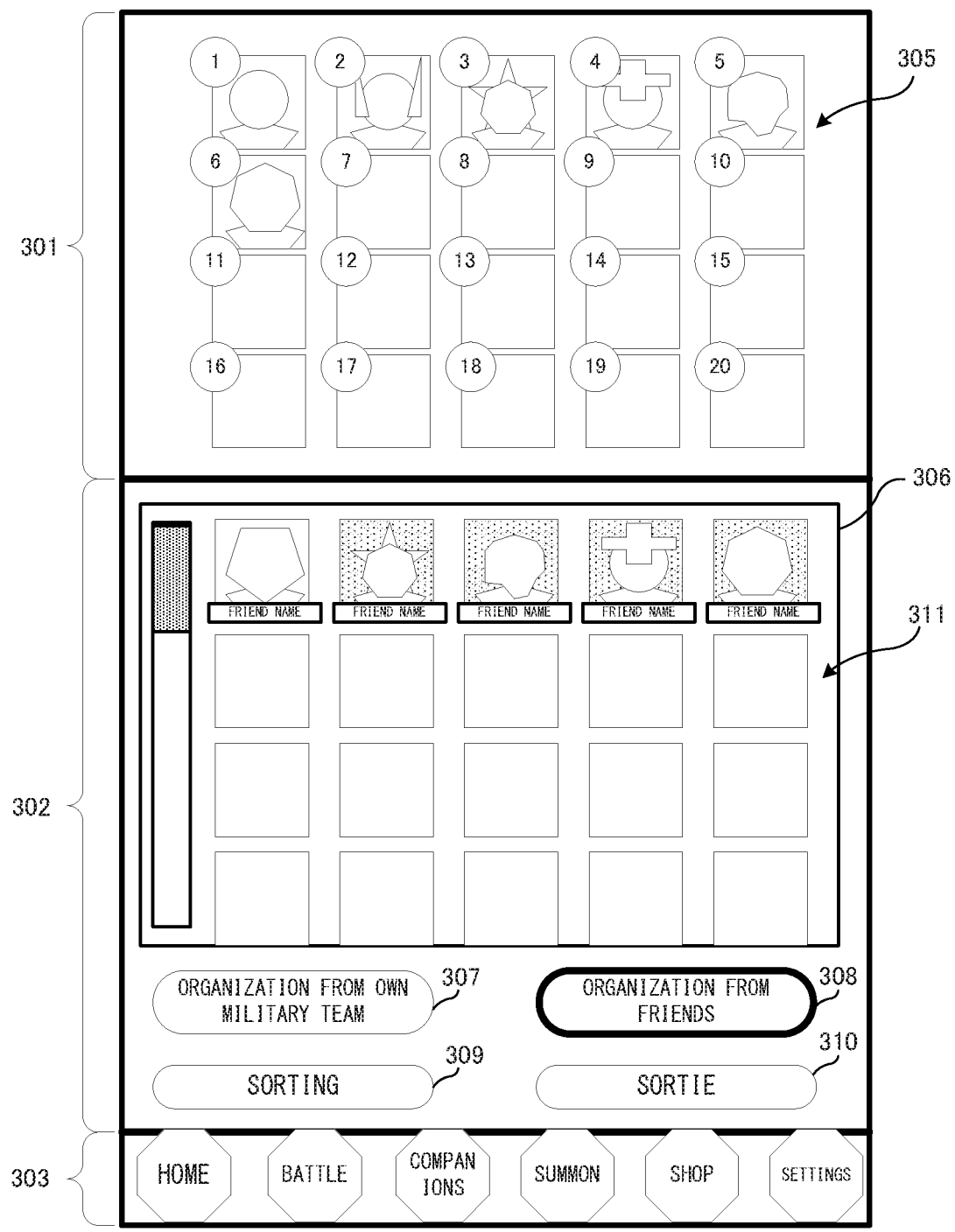
FIG. 9 shows a non-limiting example of a troop organization screen.

Next, in the state in FIG. 7, the user taps the friend organization button 308. Accordingly, as shown in FIG. 8, the leader units of the friends of the user, that is, a friend unit list, is displayed in the unit list display portion 306. Here, the number of friends is five. Then, similar to the above, when the user taps the frames 311 of friend units that are desired to be organized into the troop, the tapped friend units are sequentially added and displayed as members in the troop frames 305 in the troop frame screen 301. As an example, FIG. 9 shows an example of a screen in a state where four of the five friend units have been further added to the troop as members of the troop. Thus, at this point of time, the troop shown in the troop frame screen 301 is composed of six units in total. When the number of user owned units or the number of friends is sufficient, the troop frames 305 for 20 units can be filled by repeating the above operations. Then, after all the troop frames 305 are filled, the user can end the organization screen and start a TBSG process using the above-described map, by tapping the sortie button 310.

In the present embodiment, in the organization screen (and automatic organization described later), two or more units that are "same units" cannot be added to a troop as members of the troop. In the present embodiment, the "same units" refer to units having identical data as data in the game. For example, the "same units" are units to which the same ID (for example, a later-described unit ID 511) is assigned on game data (for example, later-described unit master data 502). That is, 20 units that form a troop are units that are substantially different from each other (units based on different unit data). As described above, in the TBS each unit is set as a "character". Thus, two or more "characters" that are exactly the same, to be more exact, two or more "characters" based on the exactly same character data, cannot be added to a troop as members of the troop. For example, two or more characters having the "same name" cannot be added. Thus, for example, when the user performs operations for adding the same units to a troop, a process of presenting the addition being impossible, to the user, by presenting a warning message "Same units cannot be added" or the like is also performed. In addition, a state where the same units have been added may be obtained, and such display may be also performed in the screen, but start of the game may be limited. For example, when the sortie button 310 is tapped in a state where two or more units that are the same are present in a troop, the above warning message may be presented. In another exemplary embodiment, in accordance with a content of the game, even in a state where two or more units having such substantially same contents have been added to a troop as members of the troop, the game may be able to be started.

[Automatic Organization]

Next, the above-described "automatic organization" function will be described. This is a function that is executed when the sortie button 310 is tapped in a state where part of the troop frames 305 is still empty, that is, in a state where not all the troop frames 305 for 20 units have been filled. For example, in a state where the troop frames 305 for six units have been filled as shown in FIG. 9 described above, the user taps the sortie button 310. This function is a function to fill the remaining empty frames for 14 units with units that are not owned by the user, that is, the user unowned units, in such a case. In the present embodiment, as an example of the user unowned units used here, units automatically created by the processor section 121 on the basis of a predetermined condition (hereinafter, referred to as automatic creation units) are used. That is, in the present embodiment, the processor section 121 creates 14 automatic creation units to make up for the deficiency. In other words, the TBSG can be considered to be started in a state where all the troop frames 305 for 20 units have been filled.

By using this automatic organization function, the user is allowed to start the TBSG, for example, even when the number of units selected in the above manual organization is 0. That is, also when the sortie button 310 is tapped in a state all the troop frames 305 are empty as shown in FIG. 5 described above, all the troop frames 305 for 20 units are filled with automatic creation units by the automatic organization function, and the TBSG is stared.

The automatic creation units are created on the basis of unit data stored in advance as game data of the TBSG, for example, on the basis of the later-described unit master data 502. Although described in detail later, for example, basic parameters and image data of characters are defined in the unit master data 502. A unit is automatically created by setting a predetermined level and skill for a character on the basis of the defined contents. Thus, all units that can appear in the TBSG can be objects to be added to a troop as members of the troop. In other words, units that are not owned by the user can be also added to a troop as members of the troop. That is, also in the case of this automatic organization, similar to the case of using friend units in the above manual organization, troop organization using the user unowned units can be performed. In addition, such automatic creation units can be considered as units that are not associated with any user.

In the present embodiment, there is the limitation on the "same units" as described above, and thus control in which a unit that is the same as any unit that has been already added to a troop as a member of the troop is not automatically created is also performed. In another exemplary embodiment, regarding control of automatic creation by the automatic organization function, control in which all the user owned units are excluded from objects to be automatically created may be performed. In addition, in another exemplary embodiment in which it is possible to add two or more units that are the same, all unit data stored in advance as game data may be simply objects to be used for automatic creation, without distinguishing between user owned units and user unowned units.

In the case where the above-described automatic organization function is used, the user cannot recognize what units are in the frames corresponding to the deficiency in the troop. That is, until the automatic creation units actually appear on the map, the user does not known what units have been added to the troop. The case where the user taps the sortie button 310 in the state in FIG. 9 described above is taken as an example. At the time of start of the game, for example, as the own military team units 204A to 204F (units "A1" to "A6") in FIG. 4 described above, user owned units and friend units that are manually organized by the user are arranged. On the other hand, as the own military team units 204G and 204H (units "A7" and "A8"), automatic creation units are arranged. That is, at this point of time, it is possible for the user to recognize, for the first time, what units have been added to the troop as the own military team units 204G and 204H.

The performance, degree of growth, and status of the unit may be adjusted in accordance with a content of the game when troop organization is performed. For example, a "unit A" acquired as a result of progress of the above story mode is present, and the "unit A" has grown to "level 10" as a result of further progress of the story mode using the "unit A". The case of performing the TBSG using the map 201 shown in FIG. 4 described above as the above event mode in this state is assumed. Then, the "unit A" is added to the troop as a member of the troop at this time. In this case, the level of the "unit A" may be temporarily changed in accordance with the content of an event, the level of difficulty in the TBSG, or the like. For example, in the present embodiment, only while the TBSG using the map 201 is performed, the level is changed to the maximum. That is, the level is changed to the maximum, and the "unit A" is added to the troop as a member of the troop. In addition, such change may be performed on not only the user owned units but also the friend units and the automatic creation units. That is, in the case of adding a friend unit to the troop as a member of the troop, a process of changing the level of the friend unit to the maximum and adding the friend unit to the troop as a member of the troop is performed. Moreover, in the case of an automatic creation unit, the automatic creation unit is automatically created such that the level thereof is the maximum. Accordingly, for example, in a game having a high level of difficulty, it is possible to avoid a situation where progress of the game becomes difficult due to "weak" units being automatically created as automatic creation units, thereby making it impossible for the user to sufficiently enjoy the game.

As a matter of course, in another exemplary embodiment, such adjustment is not limited to maximizing the level. For example, the levels of the units may be uniformly changed to level 1 in accordance with the level of difficulty in the TBSG to be executed. In addition, for example, the friend units and the automatic creation units may be adjusted such that the performance thereof is slightly weaker than that of the user owned units, that is, units raised by the user themselves. Moreover, for example, for the user owned units, such adjustment of the level or the like may not be performed. In this case, the user owned units can be used as they are in a state of being used so far, and thus it is possible for the user to play in a state where the units owned by the user are in a familiar state for the user. Furthermore, for both the user owned units and the friend units, such adjustment of the level or the like may not be performed. That is, regarding units raised by the user or each friend, the user may be allowed to play with the units being in a state as they are raised.

As described above, in the TBSG of the present embodiment, it is possible to perform troop organization using units different from the units owned by the user. Accordingly, for example, in the case of providing a TBSG using a troop composed of 20 units as described, even if the number of units owned by the user is small, it is possible to allow the user to play the TBSG by using friend units or automatic creation units.

For example, in the case of the above "manual organization", the user owned units and the friend units that may include the user unowned units can be added to a troop as members of the troop on the basis of operations of the user. Accordingly, there is an advantage in that: a troop using the user owned units with which the user is familiar can be organized; and it is possible for the user to organize a troop while recognizing the performance and the like of the friend units. In particular, since the above-described "combination effect" is present in the TBSG of the present embodiment, the strategic characteristics are enhanced also in terms of which units to be caused to appear and in which order the units are caused to appear, from the viewpoint of intentionally exercising the "combination effect". Therefore, there is an advantage in that it is possible to manually organize a troop while recognizing each unit. In addition, by making more friends, it is possible to use more friend units, and thus it is possible to enhance the user's motivation for making friends.

In the case of the "automatic organization", there is an advantage in that, even when the number of units owned by the user or the number of friends of the user is small as described above, it is possible to allow the user to enjoy the TBSG. In addition, in the present embodiment, since the TBSG cannot be started unless all the frames for 20 units have been filled for a troop, there is also an advantage in that time and effort for troop organization can be saved. For example, the user who owns 20 or more characters but desires to avoid time and effort for manual organization can start the TBSG also by making a "sortie" with all the troop frames 305 intentionally kept empty. There is also an advantage in that the convenience is increased for the user who desires to save time and effort for manual organization and readily start the TBSG as described above. Moreover, when the automatic organization is used and a "sortie" is made, the user starts playing without recognizing what contents the units of the own military team have. Accordingly, for example, by allowing the user to make a "sortie" with all the troops intentionally kept empty, it is possible to allow the user to enjoy play with a feeling of excitement in which the user causes the own troop to fight without recognizing the contents of the troop.

Being able to use the above friend units or automatic creation units means that the user is able to "try out" the user unowned units. Accordingly, it is possible to get the user to experience the performance and the like of a unit that is not owned by the user, thereby enhancing the motivation for acquiring such a user unowned unit and further enhancing the entertainment characteristics of the game.

In the "manual organization", the example in which it is possible to use units owned by other users who have a predetermined relationship with the user, here, "friends", has been described. In another exemplary embodiment, it may be possible to use units owned by other users whom the user unilaterally follows, or other users by who the user is unilaterally followed, in addition to other users who have a so-called "friend" relationship with the user, that is, who have a relationship in which the other users and the user have authenticated each other. Moreover, it may be possible to use units owned by some specific users that have satisfied a predetermined condition, such as users called "top rankers" or "top players".

In the "automatic organization", it may be possible to use units owned by users having a relationship of unilaterally following or being followed, or units owned by "top rankers" or the like. That is, as the user unowned units to be added by the automatic organization function, units may be selected and added from among the units owned by these users according to a predetermined condition.

In the "manual organization", not only the above friend units and units owned by specific users who are not friends, but also some kinds of user unowned units may be presented to the user and be selectable. For example, leader characters of other users who have logged in within the last one hour and do not particularly have a friend relationship or the like with the user may be displayed in a list in the unit list display portion 306, and it may be possible to add a plurality of leader characters to a troop as members of the troop. In this case, even when all the leader characters of the other users displayed at that time happen to be "weak" units, it is possible to start the game by organizing these units into a troop and tapping the sortie button 310.

[Details of Game Process of Present Embodiment]

Next, the TBSG process according to the present embodiment will be described in more detail with reference to FIGS. 10 to 22.

[Data to be Used]

Various kinds of data to be used in the TBSG process will be described. First, data to be used by the server 101 will be described. FIG. 10 is a memory map showing an example of various kinds of data stored in the memory 112 of the server 101. In the memory 112 of the server 101, a server-side program 401, a user database 402, automatic creation condition data 403, etc., are stored.

The server-side program 401 is a program for performing processes regarding the TBSG according to the present embodiment. For example, the server-side program 401 is a program for performing a user log-in process, a process of transmitting or receiving predetermined user data included in the user database 402 to or from the information processing terminal 102, and a process for transmitting various kinds of data required for the TBSG to the information processing terminal 102 as appropriate.

The user database 402 is a database that is a set of data regarding each user who plays the TBSG. In the present embodiment, the user database 402 is a database configured such that user data 404 shown in FIG. 11 is one record. After the log-in process is performed, a process of acquiring the user data 404 corresponding to the user from the server 101, and the like are performed in the information processing terminal 102.

The data configuration of the user data 404 will be described with reference to FIG. 11. The user data 404 shown in FIG. 11 includes a user ID 405, profile information 406, user owned unit data 407, friend data 408, progress state data 409, etc. The user ID 405 is an ID for uniquely identifying each user. The profile information 406 includes various kinds of information required for the log-in process, and information regarding each user such as the handle of each user.

The user owned unit data 407 is data indicating units owned by the user. FIG. 12 is a diagram showing an example of the data configuration of the user owned unit data 407. The user owned unit data 407 is data in a table format having items such as an owned number 411, a unit ID 412, a current Lv 413, an equipped skill 414, and a leader flag 415. The owned number 411 is a number for uniquely identifying each user owned unit. For example, the owned number 411 is a number allocated in order in which units are acquired. The unit ID 412 corresponds to the unit ID 511 in the later-described unit master data 502. The current Lv 413 is data indicating the current level of the unit. The equipped skill 414 is data indicating skills currently possessed by the unit. The leader flag 415 is data for indicating whether the unit has been set as the leader unit. In addition to the data described here, for example, data indicating the date at which each unit was acquired is also included in the user owned unit data 407.

Referring back to FIG. 11, the friend data 408 is data for indicating other users registered as "friends" by the user. The friend data 408 is data of a so-called "friend list".

The progress state data 409 is data for indicating a progress state of the game for the user. For example, the progress state data 409 is data indicating the degree of progress in the story mode, etc. The user is allowed to restart the previously suspended game from the continuation thereof on the basis of the progress state data 409.

Figures 13, 14:
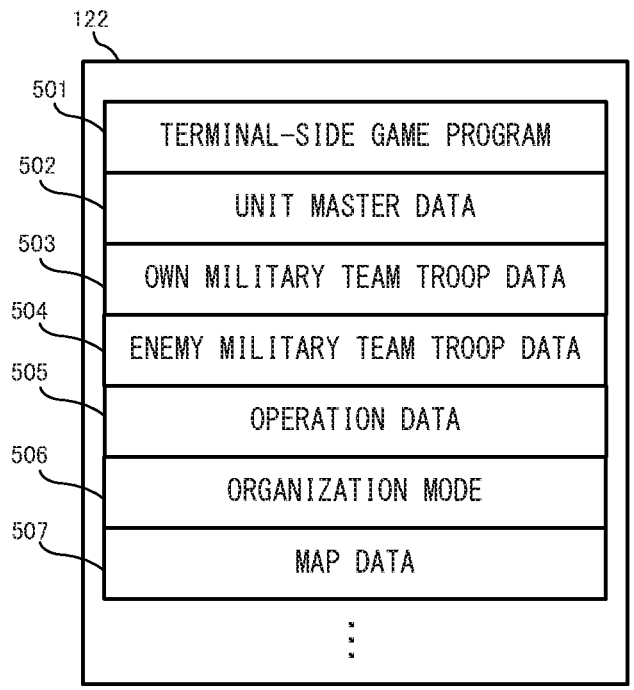
FIG. 13 shows a non-limiting example of data stored in a memory 122 of the information processing terminal 102.
FIG. 14 shows a non-limiting example of the data configuration of unit master data 502.

Next, various kinds of data stored in the memory 122 of the information processing terminal 102 will be described. FIG. 13 is a memory map showing an example of various kinds of data stored in the memory 122 of the information processing terminal 102. In the memory 122 of the information processing terminal 102, a terminal-side game program 501, the unit master data 502, own military team troop data 503, enemy military team troop data 504, operation data 505, an organization mode 506, map data 507, etc., are stored.

The terminal-side game program 501 is a program for performing the game process according to the present embodiment. That is, the terminal-side game program 501 is a program for executing the above-described process for troop organization and the TBSG process using the map 201 shown in FIG. 4 described above.

The unit master data 502 is a database in which all units that appear in the TBSG are defined. The data is updatable as appropriate on the basis of update data transmitted from the server 101, and data of new units may be added thereto every update. FIG. 14 shows an example of the data structure of the unit master data 502. In FIG. 14, the unit master data 502 is data in a table format having items such as the unit ID 511, image/sound data 512, an initial parameter 513, parameter definition data 514 at each level, and combination effect definition data 515.

The unit ID 511 is an ID for identifying the unit. The image/sound data 512 is data of an appearance image of the unit, and, for example, when the unit is a character, the image/sound data 512 is data of voice of the character. The initial parameter 513 is data that defines an ability value in the initial state of the unit (for example, when the level of the unit is level 1). The parameter definition data 514 at each level is data that defines the degree of growth of each unit, and is data that defines an ability value at each level. The combination effect definition data 515 is data that defines a condition for exercising the above-described "combination effect", etc.

In an automatic creation process by the above-described automatic organization function, a predetermined unit is created on the basis of the unit master data 502. For example, any unit ID 511 is randomly selected, and unit data in which the ability value at the maximum level is set is generated by referring to the parameter definition data 514 at each level, and is added to the later-described own military team troop data 503.

Figure 15:
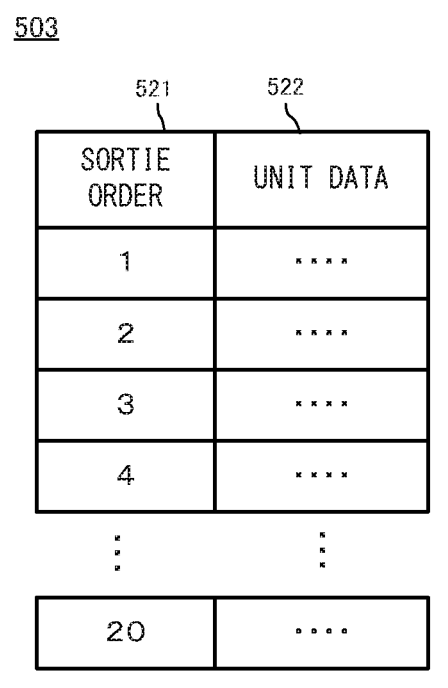

Referring back to FIG. 13, the own military team troop data 503 is data for indicating the above-described troop of the own military team. The own military team troop data 503 is generated by the above-described "manual organization" operations or "automatic organization" function. FIG. 15 shows an example of the data structure of the own military team troop data 503. The own military team troop data 503 is data in a table format having items such as a sortie order 521 and unit data 522, and records for 20 units are prepared in total therein. The sortie order 521 is data indicating the above-described sortie order, and is a number for identifying each unit in the own military team troop. The unit data 522 is data for indicating each unit in the own military team troop. For example, when a user owned unit or a friend unit is added to the troop, information indicating the unit ID 511 and the level of the added unit is set as the unit data 522. In addition, in the case of an automatic creation unit, information indicating the unit ID 511, the level, and the like of an automatically created unit is set.

Referring back to FIG. 13, the enemy military team troop data 504 is data for indicating the enemy military team troop. The data configuration of the enemy military team troop data 504 is basically the same as that of the own military team troop data 503. Regarding the contents of the enemy military team troop data 504, data for all the 20 units is automatically generated by the processor section 121.

The operation data 505 is data indicating the contents of various operations performed on the operation section 123. In the present embodiment, the operation data 505 includes presence/absence of an input to the touch panel as the operation section 123, data indicating a touch coordinate or the like of the input, data indicating pressed states of various buttons that are not shown, and the like.

The organization mode 506 is data to be used in a later-described troop organization process, and is data for indicating whether the current operation mode is the "sorting mode".

The map data 507 is data that defines the configuration of the above-described map 201. For example, the map data 507 is data that is distributed from the server 101 and stored.

In addition, in the memory 122, for example, the user data 404 acquired from the server 101 is temporarily stored. Moreover, various kinds of working data to be used in this process, etc., are also stored as appropriate.

[Details of Process Performed by Processor Section 121]

Next, the game process according to the present embodiment will be described in detail with reference to flowcharts in FIGS. 16 to 22. Here, processes in the information processing terminal 102 will be mainly described. Regarding processes in the server 101, a description is appropriately added as necessary. In addition, a process regarding the above-described troop organization and the TBSG process using the map 201 will be mainly described, and the description of the other game processes is omitted. Moreover, prior to these processes, the user data 404 is acquired from the server 101 and stored in the memory 122.

Figure 16:
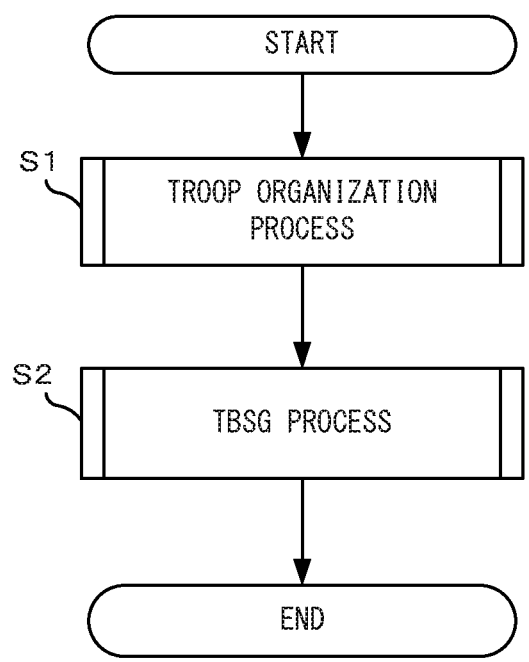
FIG. 16 is a flowchart showing the details of a game process according to the embodiment.

FIG. 16 is a flowchart showing the whole image of the game process according to the present embodiment. First, the troop organization process is performed in step S1, and then the TBSG process using a troop created in this process is performed in step S2.

Figure 17:
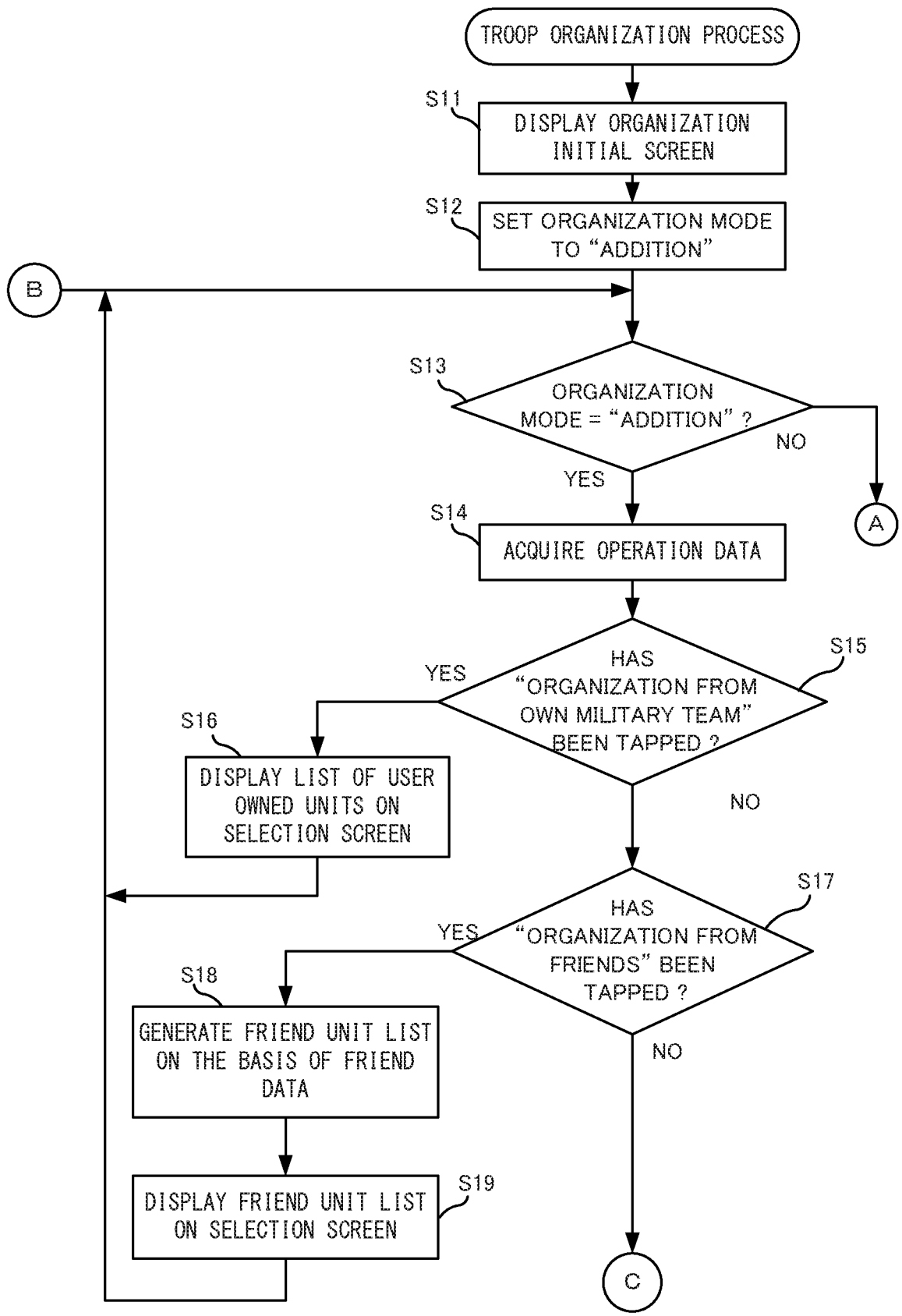
FIG. 17 is a flowchart showing the details of a troop organization process.

FIG. 17 is a flowchart showing the details of the troop organization process. First, in step S11, a process for displaying an initial screen for troop organization is performed. Specifically, the processor section 121 refers to the user owned unit data 407 of the user data 404 acquired from the server 101 and stored in the memory 122, and specifies the units owned by the user. Furthermore, the processor section 121 refers to the unit master data 502 and generates a list of the user owned units including images of the user owned units. Then, the processor section 121 performs a process of displaying the user owned unit list on the selection screen 302. In addition, a process of initializing the own military team troop data 503 is also performed.

Subsequently, in step S12, the processor section 121 sets data indicating "addition", in the organization mode 506.

Next, in step S13, the processor section 121 determines whether the organization mode 506 is "addition". When the organization mode 506 is not "addition" (NO in step S13), the organization mode 506 is the "sorting mode", and thus the processor section 121 advances the processing to later-described step S26. On the other hand, when the organization mode 506 is "addition" (YES in step S13), the processor section 121 acquires the operation data 505 in step S14. Next, in step S15, the processor section 121 determines whether the content of the operation of the user indicated by the operation data 505 is an operation in which the own military team organization button 307 has been tapped. As a result of the determination, when a tap operation on the own military team organization button 307 has been performed (YES in step S15), the processor section 121 performs a process of generating a list of the user owned units and displaying the list on the selection screen 302 in step S16. Thereafter, the processor section 121 returns to step S13 described above, and repeats the process.

On the other hand, as a result of the determination in step S15, when a tap operation on the own military team organization button 307 has not been performed (NO in step S15), the processor section 121 determines next in step S17 whether the content of the operation of the user indicated by the operation data 505 is an operation in which the friend organization button 308 has been tapped. As a result of the determination, when a tap operation on the friend organization button 308 has been performed (YES in step S17), the processor section 121 performs a process for displaying a friend unit list on the selection screen 302. Specifically, first, in step S18, the processor section 121 performs the following processes in cooperation with the server 101. First, the server 101 performs a process of referring to the friend data 408 and specifying friends of the user. Next, the server 101 refers to the user owned unit data 407 of each of the specified friends, and acquires data of units for which the leader flag 415 is set to be ON, that is, data of leader units, from the user database 402. Then, list data indicating the leader unit of each friend is transmitted from the server 101 to the information processing terminal 102. The processor section 121 generates a list of the friend units on the basis of the data transmitted thereto. Thereafter, in step S19, the processor section 121 performs a process of displaying the friend unit list on the selection screen 302. Thereafter, the processor section 121 returns to step S13 described above, and repeats the process.

Figure 18:
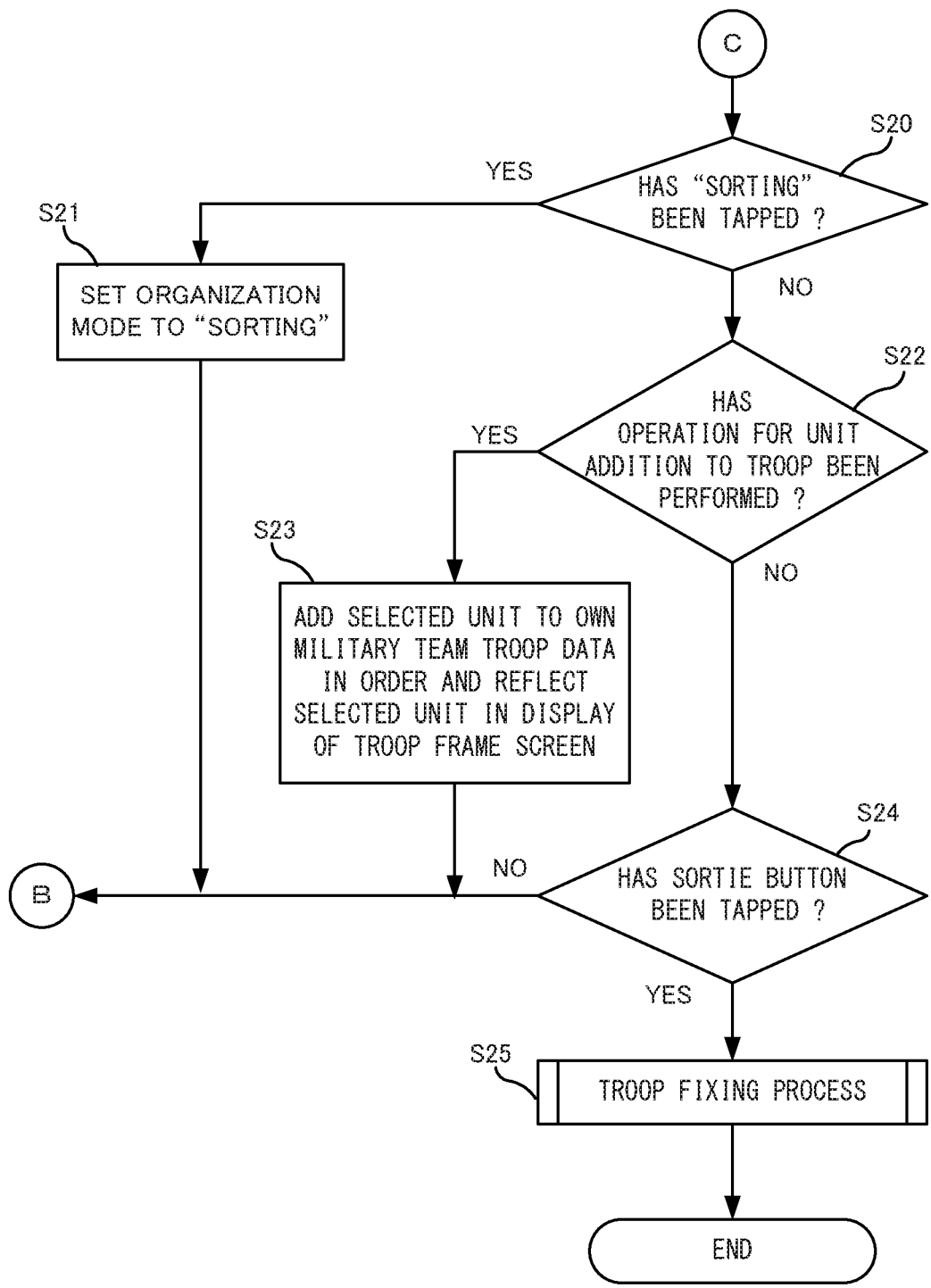
FIG. 18 is a flowchart showing the details of the troop organization process.

On the other hand, as a result of the determination in step S17, when a tap operation on the friend organization button 308 has not been performed (NO in step S17), the processor section 121 determines next in step S20 in FIG. 18 whether the content of the operation of the user indicated by the operation data 505 is a tap operation on the sorting button 309. As a result of the determination, when the content of the operation of the user indicated by the operation data 505 is a tap operation on the sorting button 309 (YES in step S20), the processor section 121 sets data indicating "sorting", in the organization mode 506 in step S21. Thereafter, the processor section 121 returns to step S13 described above, and repeats the process.

On the other hand, as a result of the determination in step S20, when a tap operation on the sorting button 309 has not been performed (NO in step S20), the processor section 121 determines next in step S22 whether the content of the operation of the user indicated by the operation data 505 is an operation for adding a unit to the troop. Specifically, the processor section 121 determines whether an operation of tapping any of the frames 311 in which units are displayed has been performed in the selection screen 302. As a result of the determination, when the content of the operation of the user indicated by the operation data 505 is an operation for adding a unit (YES in step S22), the processor section 121 performs, in step S23, a process of adding data indicating units corresponding to the units tapped in the selection screen 302, to the own military team troop data 503 in order on the basis of the operation content. When the user owned unit list has been displayed on the selection screen 302, the user owned unit selected through the tap is added to the own military team troop data 503. In addition, when the friend unit list has been displayed on the selection screen 302, the friend unit selected through the tap is added to the own military team troop data 503. Moreover, at the time of this addition, the processor section 121 also performs a level adjustment process as described above. In the present embodiment, a process of changing the levels of the user owned units and the friend units to the maximum regardless of actual raised states of these units and adding these units to the troop, is performed. Furthermore, when the operation content corresponds to an operation for adding the above "same" unit to the troop, a process of displaying a message "Cannot add" and cancelling the operation for the addition is also performed. Then, the processor section 121 performs a process of updating the contents displayed on the troop frame screen 301, on the basis of the latest own military team troop data 503. Thereafter, the processor section 121 returns to step S13 described above, and repeats the process.

On the other hand, as a result of the determination in step S22, when an operation for adding a unit to the own military team troop has not been performed (NO in step S22), the processor section 121 determines next in step S24 whether the content of the operation of the user indicated by the operation data 505 is a tap operation on the sortie button 310. As a result of the determination, when the content of the operation of the user indicated by the operation data 505 is not a tap operation on the sortie button 310 (NO in step S24), the processor section 121 returns to step S13 described above, and repeats the process. On the other hand, when the content of the operation of the user indicated by the operation data 505 is a tap operation on the sortie button 310 (YES in step S24), the processor section 121 performs a troop fixing process in step S25.

In the present embodiment, the process of adding a content selected from among the contents owned by the user (the user owned units) on the basis of an operation of the user and adding the selected content to a group (troop), in the processes to step S24 described above, can be considered as a first addition process. Meanwhile, addition from the friend units can be considered as a second addition process of adding a predetermined content among contents not owned by the user, to the group. In addition, the process in step S25 described next can be also considered as the second addition process.

Figure 20:
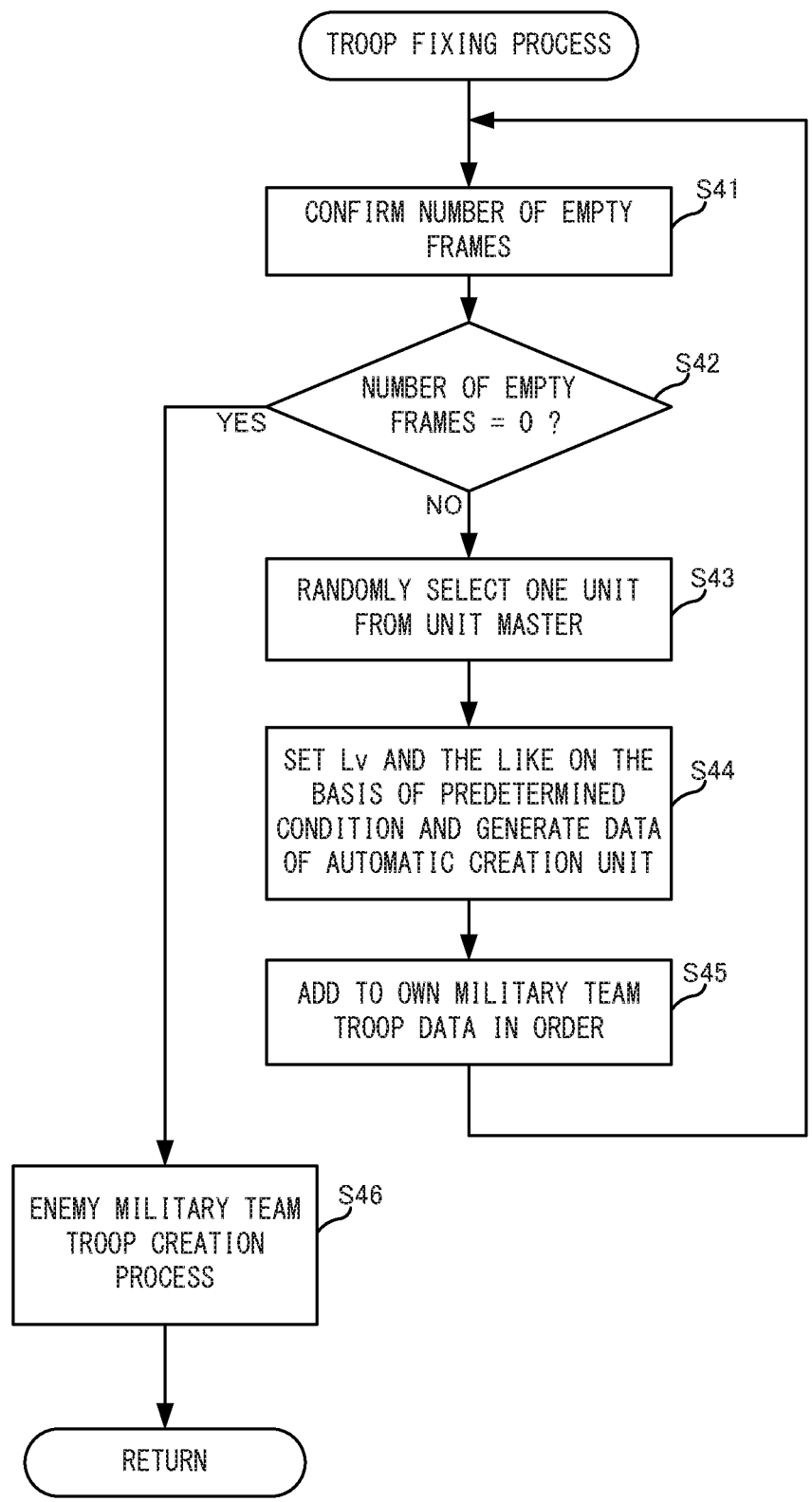
FIG. 20 is a flowchart showing the details of a troop fixing process.

FIG. 20 is a flowchart showing the details of the troop fixing process. First, in step S41, the processor section 121 performs a process of referring to the own military team troop data 503 and confirming the number of frames to which units have not been added yet (hereinafter, empty frames).

Next, in step S42, the processor section 121 determines whether the number of empty frames is 0. As a result, when the number of empty frames is not 0 (NO in step S42), the processor section 121 performs a process for adding an automatic creation unit to each empty frame. Specifically, in step S43, the processor section 121 refers to the unit master data 502 and randomly selects any one unit data set. At this time, control is performed such that data having a unit ID that is the same as that of any unit already added to the own military team troop is not selected.

Next, in step S44, the processor section 121 performs a process of determining the level of the unit selected in step S43 described above, on the basis of a predetermined condition. For example, the processor section 121 acquires the automatic creation condition data 403 from the server 101 and stores the automatic creation condition data 403 in the memory 122. Then, the processor section 121 refers to the automatic creation condition data 403 and determines the level on the basis of a condition defined by the data. In the present embodiment, a condition of maximizing the level is defined as the predetermined condition. In addition, for example, a process of determining the contents of skills possessed by the unit and the like as appropriate is performed on the basis of the content defined by the automatic creation condition data 403. Then, the processor section 121 creates an automatic creation unit in which these determined contents are reflected.

Next, in step S45, the processor section 121 performs a process of adding data indicating the created automatic creation unit, to the own military team troop data 503 in order. Thereafter, the processor section 121 returns to step S41 described above, and repeats the process.

On the other hand, as a result of the determination in step S42 described above, when the number of empty frames is 0 (YES in step S42), 20 units have been added to the own military team troop, and thus, next, in step S46, the processor section 121 performs a process of creating an enemy military team troop. That is, the processor section 121 performs a process of setting unit data for the 20 units in the enemy military team troop data 504. This process is basically the same as that in the case of creating the automatic creation unit, and a process of adding unit data for the 20 units to the enemy military team troop data 504 is performed. When this process is ended, the troop fixing process is ended.

Referring back to FIG. 18, when the troop fixing process is ended, the troop organization process is ended.

Figure 19:
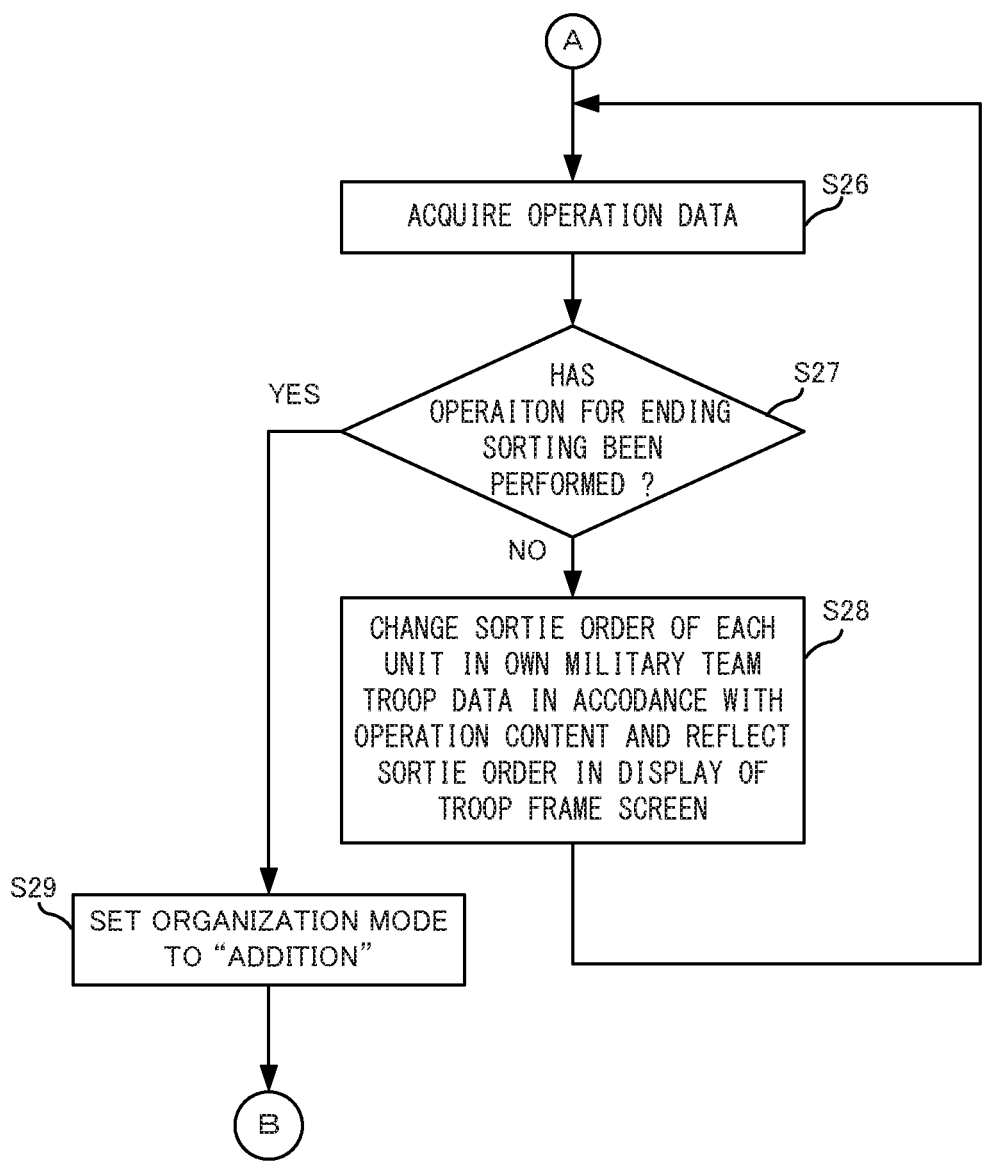
FIG. 19 is a flowchart showing the details of the troop organization process.

On the other hand, as a result of the determination in step S13 in FIG. 17 described above, when the organization mode 506 is not "addition" (NO in step S13), the processor section 121 acquires the operation data 505 in step S26 in FIG. 19. Next, in step S27, the processor section 121 determines whether the content of the operation of the user indicated by the operation data 505 is an operation indicating that the sorting mode is to be ended. For example, a "sorting end" button is displayed in the sorting mode, and when the button is tapped, the processor section 121 determines that an operation indicating that the sorting mode is to be ended has been performed. As a result of the determination, when an operation for ending the sorting mode has not been performed (NO in step S27), the processor section 121 performs, in step S28, a process of changing the order of the respective units in the own military team troop data 503 on the basis of the operation content indicated by the operation data 505, and a process of updating the screen on the basis of the content of the change. Thereafter, the processor section 121 returns to step S26 described above, and repeats the process. On the other hand, when an operation for ending the sorting mode has been performed (YES in step S27), the processor section 121 sets the organization mode 506 to be "addition" in step S29. Thereafter, the processor section 121 returns to step S13 described above, and repeats the process.

This is the end of the description of the troop organization process.

Figure 21:
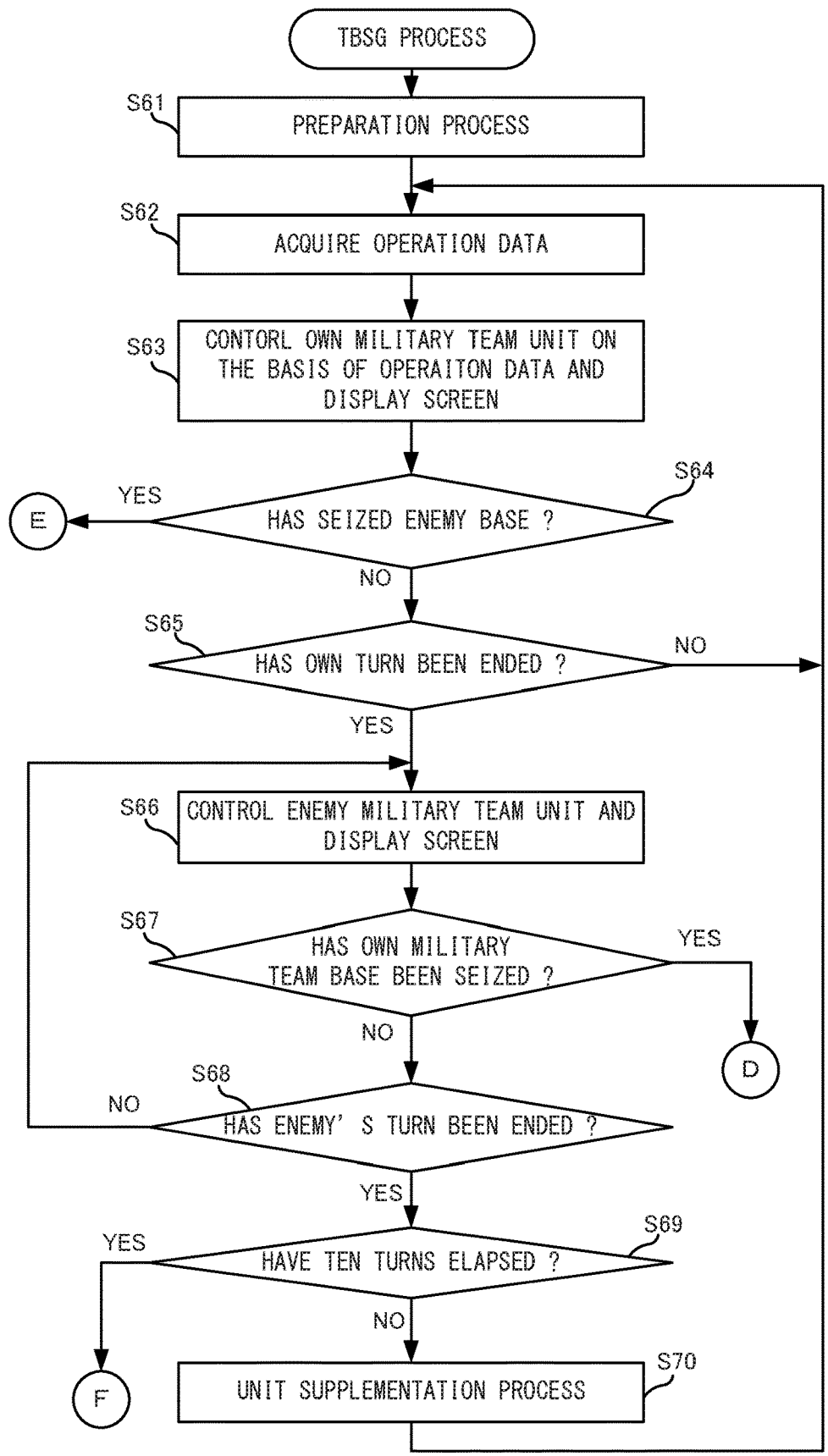
FIG. 21 is a flowchart showing the details of a TBSG process.

Next, the TBSG process performed subsequent to the troop organization process will be described in detail. The TBSG process starts with a turn of the own military team. FIG. 21 is a flowchart showing the details of the TBSG process in step S2 described above. First, in step S61, the processor section 121 performs a preparation process. Specifically, the following processes are performed by the processor section 121. First, a process of creating the map 201 used in the TBSG process and arranging the map 201 in a virtual game space is performed on the basis of the map data 507. Furthermore, a process of reading the own military team troop data 503 and arranging eight own military team units at predetermined positions on the map 201 on the basis of the data of the units that are the first to the eighth in the sortie order, is performed. Moreover, a process of acquiring the enemy military team troop data 504 and similarly arranging eight enemy military team units that are the first to the eighth in the sortie order, at predetermined positions on the map 201, is also performed. Then, a process of creating the game screen shown in FIG. 4 described above and displaying the game screen on the display section 124 is performed.

Next, in step S62, the processor section 121 acquires the operation data 505. Next, in step S63, the processor section 121 performs a process of controlling any of the own military team units on the basis of the operation content indicated by the operation data 505. Furthermore, the processor section 121 performs a process of displaying a game screen in which the control is reflected. For example, control of movement of the own military team units, an attack on the enemy military team unit or the enemy military team base 203, use of various skills, etc., is performed. In addition, determination as to whether the condition for exercising the above-described "combination effect" has been satisfied is performed, and a process of exercising the combination effect is performed when the condition has been satisfied. Moreover, as a result of the attack on the enemy military team unit, when the own military team unit is, for example, counterattacked and destroyed, control in which the own military team unit is deleted from the map and the related "combination effect" is deleted is also performed.

Next, in step S64, the processor section 121 determines whether the user has seized the enemy military team base 203. As a result of the determination, when the user has seized the enemy military team base 203 (YES in step S64), the processor section 121 advances the processing to later-described step S73. On the other hand, when the user has not seized the enemy military team base 203 yet (NO in step S64), the processor section 121 determines next in step S65 whether the turn of the own military team has been ended. For example, whether a "turn end" button has been tapped is determined. In addition, also when actions of all the own military team units on the map have been ended, it is determined that the turn of the own military team has been ended. As a result of the determination, when the turn of the own military team has not been ended (NO in step S65), the processor section 121 returns to step S62 described above, and repeats the process.

On the other hand, when the turn of the own military team has been ended (YES in step S65), a process regarding a turn of the enemy military team is performed next. First, in step S66, the processor section 121 controls actions of any of the enemy military team units that are present on the map. That is, actions, such as movement of the enemy military team unit and an attack on the own military team unit or the own military team base 202, are controlled. In addition, as a result of the own military team unit being attacked, when the own military team unit is destroyed, control in which the own military team unit is deleted from the map and the related "combination effect" is deleted is also performed similar to the above. Furthermore, the processor section 121 also performs a process of displaying a game screen in which the result of the control is reflected.

Next, in step S67, the processor section 121 determines whether the own military team base 202 has been seized by the enemy military team troop. As a result, when the own military team base 202 has been seized (YES in step S67), the processor section 121 advances the processing to later-described step S74. When the military team base 202 has not been seized yet (NO in step S67), the processor section 121 determines in step S68 whether the turn of the enemy military team has been ended. That is, the processor section 121 determines whether the above control has been performed on all the enemy military team units that are present on the map. As a result, when the turn of the enemy military team has not been ended (NO in step S68), the processor section 121 returns to step S66 described above, and repeats the process regarding the turn of the enemy military team.

On the other hand, when the turn of the enemy military team has been ended (YES in step S68), the processor section 121 determines next in step S69 whether 10 turns have elapsed. As a result, when 10 turns have not elapsed yet (NO in step S69), the processor section 121 performs a unit supplementation process in step S70. That is, when any unit that has been destroyed at this turn is present, a process of adding units as supplements from among reserve units according to the sortie order is performed in accordance with the number of units destroyed. This process is performed for both the own military team and the enemy military team. Thereafter, the turn is advanced by one, and the processor section 121 returns to step S62 described above, and repeats the process.

Figure 22:
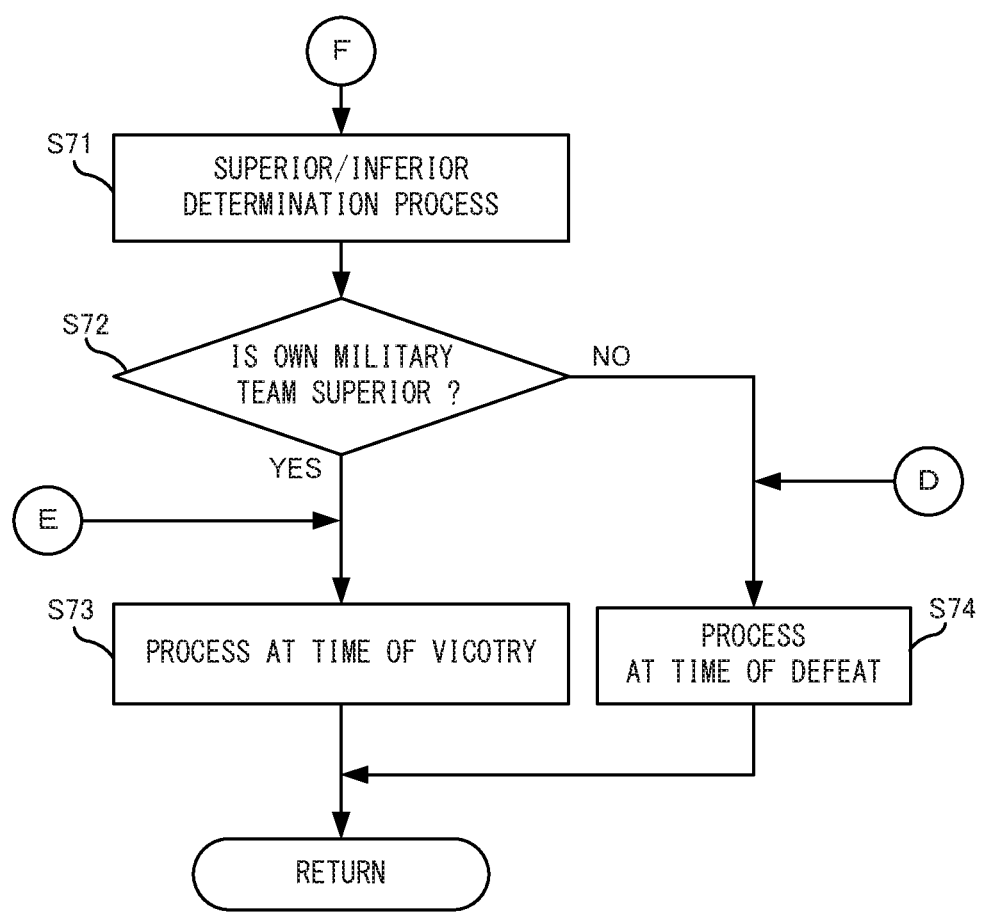
FIG. 22 is a flowchart showing the details of the TBSG process.

On the other hand, as a result of the determination in step S69 described above, when 10 turns have elapsed (YES in step S69), the processor section 121 performs, in step S71 in FIG. 22, a superior/inferior determination process for determining whether the own military team is superior. That is, although 10 turns have elapsed, both bases of the own military team and the enemy military team have not been seized, and thus a process for bringing the battle to an end through determination is performed. Specifically, a process of comparing the numbers of destroyed units of both teams, the numbers of attacks on the bases of both teams, etc., is performed. For example, when the number of enemy military team units destroyed is larger than the number of own military team units destroyed, it is determined that the own military team is superior. On the other hand, when the number of own military team units destroyed is larger, it is determined that the own military team is inferior.

As a result of the determination, when it is determined that the own military team is superior (YES in step S72), the processor section 121 performs a process at the time of a victory in step S73. For example, a process of displaying a victory representation and adding data indicating a predetermined reward to the user data 404, etc., is performed. On the other hand, when it is determined that the own military team is not superior, that is, is inferior (NO in step S72), the processor section 121 performs a process at the time of a defeat in step S74. For example, a process of displaying a defeat representation, etc., is performed. This is the end of the TBSG process.

As described above, in the present embodiment, for example, in the TBSG in which troops each composed of 20 units are caused to fight against each other, it is possible to organize a troop using not only units owned by the user but also units not owned by the user, by using the above friend units and automatic creation units. Accordingly, it is possible to get a user, who has a small number of units owned, for example, has an insufficient number of collected units for the reason that the user has just begun playing the game, to play the TBSG in which troops are caused to fight against each other.

[Modifications]

In the above embodiment, the TBSG in which "troops" each composed of 20 units are caused to fight against each other has been taken as an example. That is, the game in which "groups" each including a plurality of "contents" that are units are caused to fight against each other has been taken as an example. In addition to such a game, the above-described process is applicable to, for example, the case of organizing a "deck" in a card game. In this case, a "card" as a content is added to a "deck" as a group. At this time, the user may be allowed to form an own deck by using not only cards owned by the user but also a plurality of cards owned by friends. As a matter of course, card data may be automatically generated by the above automatic organization function and added to a deck. In addition, for organizing a "team" in a sport game or the like, the above-described process may be used to make it possible to organize a team using not only "players" owned by a user but also "players" not owned by the user. Moreover, the above-described process is applicable to, for example, a game in which teams engage in battle, such as a 3D FPS (first person shooting) or TPS (third person shooting). For example, a team versus FPS in which a team is composed of one user character to be operated by a user and a plurality of ally characters to be automatically controlled by the processor section 121, is assumed. In this case, the team may be able to be organized using not only characters acquired by the user through the above Gacha or the like but also characters corresponding to the above friend units and characters corresponding to the above automatic creation units, as the ally characters.

Regarding the above game process using the group, the process of the present embodiment is applicable to a game in which a predetermined mission is cleared using a group, in addition to games in which groups are caused to fight against each other such as the above TBS card game, and sport game. For example, the process of the present embodiment is applicable to a rhythm game in which a user challenges to play a predetermined musical piece using a group composed of a plurality of characters (for example, a virtual idol group, etc.). In this case, regarding the characters organized into the group, not only characters owned by the user but also characters owned by friends or the like may be able to be organized into the group.

The above contents may be, for example, "countries", "warships", "weapons", "arms", "vehicles", etc., in addition to the above units, characters, cards, etc.

For organizing a troop, a so-called cost system may be used. For example, a cost is set for each of the above units, and an upper limit cost value for a troop is set in advance. Then, a troop may be organized within the range of the cost. For example, if the total cost reaches the upper limit when 15 units have been added, it may be possible to make a sortie with a troop having the 15 units.

As an example of the user unowned units used by the automatic organization function, the example of automatic creation units created on the basis of the unit master data 502 has been described above. In addition, the user unowned units may be units described below. For example, in the case of a game in which units having no growth factor are used, the user unowned units may be units simply and randomly selected from the above unit master data 502. Moreover, for example, predetermined unit data (units not included in the unit master data 502 may be used) stored in advance in the server 101 may be acquired, and the user unowned units may be units created on the basis of the predetermined unit data. That is, units may be borrowed from the server 101. In addition, previously used friend units may be stored as "use history" in the information processing terminal 102, and the user unowned units may be units randomly selected from the history. Moreover, as the user unowned units, for example, "characters" for each which a name and appearance are set may be fixedly added, and, as the ability value, etc., of each added character, a random ability value may be generated at the time of the addition.

Regarding the above automatic creation process, finer conditions may be set as the conditions for units to be organized into a troop. For example, control, in which units having excellent attacking power are preferentially organized into a troop (attacking power is emphasized) or units having excellent defense are preferentially organized into a troop (defense is emphasized) in accordance with the content of the map, may be performed. In addition, control in which only male characters or female characters are automatically created may be performed. Moreover, for example, control in which units prepared in advance by the administrator are organized into a troop according to the map may be performed. These conditions may be defined by the above automatic creation condition data 403.

Regarding the above friend units and automatic creation units, in another exemplary embodiment, only units each of which is not the same as any of the units owned by the user may be displayed as friend units in a list, or may be created as automatic creation units. In the above example, for example, when a unit owned by both the user and a friend is present and has not been manually added by the user, this unit can be added as a friend unit to the troop. Regarding this point, in another exemplary embodiment, for example, only units each of which is not the same as any of the units owned by the user may be displayed in a friend unit list. In addition, regarding the automatic creation units, only units each of which is not the same as any of the units owned by the user may be automatically created.

In another exemplary embodiment, automatic selection from friend units may be enabled. For example, an "automatic organization from friends" button may be displayed. When a tap or the like is performed on this button, a unit to be added to a troop may be, for example, randomly selected from a friend unit list and added to the troop.

Regarding the above unit "supplementation", in the above example, the example in which, at the end of a turn, units whose number is equal to the number of units destroyed at this turn are added as supplements according to the sortie order, has been described. In addition, the trigger for supplementation may be, for example, eliminating an enemy military team unit, or a score becoming equal to or greater than a certain value. Moreover, the trigger may be the number of units destroyed becoming equal to or greater than a certain value.

In the above automatic organization function, the example in which the levels of units are uniformly maximized and the units are added to a troop has been described. In addition, for example, the levels may be adjusted according to the sortie order. For example, the levels of the units that come later in the sortie order may be set higher, or the levels of the units that come later in the sortie order may be set lower. In the former case, a user who is inexperienced in the game can be allowed to easily clear the game. On the other hand, in the latter case, the battle situation becomes more severe as the number of units destroyed increases, so that action needs to be taken such that the initial units are prevented from being destroyed as much as possible, and it is possible to provide a game with a feeling of increased excitement (for example, a game for advanced users). In either case, it is possible to enhance the entertainment characteristics of the game.

In the above embodiment, the example in which, when a "sortie" is made in a state where the troop frames 305 include any empty frame, automatic organization is performed and the TBSG is directly started, has been described. That is, the example in which the user cannot recognize automatic creation units before the automatic creation units actually appear on the map, has been described. In another exemplary embodiment, before the TBSG is started, the contents of a troop supplemented by automatic creation units may be presented to the user. For example, when the sortie button 310 is tapped in a state where the troop frames 305 include any empty frame, after the above process regarding automatic organization is performed, the contents of a troop supplemented with automatic creation units may be displayed on the troop frame screen 301. Furthermore, a question, "Make a sortie with this troop?", or the like may be asked of the user. Then, when an approval is not obtained from the user, the process regarding automatic organization may be able to be performed again. Accordingly, time and effort for manual organization are saved, and a "sortie" can be made in a state where the user recognizes the contents of the troop, so that the convenience to the user can be enhanced.

Regarding the subject that performs the above-described process, there is no limitation to the above-described configuration. For example, in the information processing system, the server-side system may be configured by a plurality of information processing apparatuses, and the processes to be performed at the server side may be divided and performed by the plurality of information processing apparatuses. In addition, for example, data other than the terminal-side game program 501 and the operation data 505 may be stored in the server 101, and each information processing terminal 102 may be configured to access the server 101 and refer to the data as necessary. In this case, for example, the information processing terminal 102 may transmit the operation data 505 indicating operations of the user to the server 101, the server 101 may execute various game processes, and the information processing terminal 102 may receive the result of the execution therefrom and generate and display a game screen in which the result of the execution is reflected.

For example, only a process of transmitting and receiving data regarding friends may be performed together with the server 101, and the other processes may be performed only by each information processing terminal 102. In this case, the user data 404 of each user may be stored in the information processing terminal 102, and the server 101 may be used only for a process regarding acquisition of information about friend units. In addition, for example, user data of registered friends may be stored in the information processing terminal 102, and the server 101 may not be used. In this case, for example, the user data 404 in the information processing terminals 102 may be exchanged directly between the information processing terminals 102 and stored in the information processing terminals 102.

What is claimed is:

1. A processing system comprising at least one processor, the at least one processor singly or in cooperation executing:
    executing a computer application program for a video game, wherein the video game includes a plurality of game elements for use during the video game, with a first set of game elements of the plurality of game elements being currently available for selection by a user of the video game and a second set of game elements of the plurality of game elements being not currently available for selection by the user of the video game;
    as part of the video game, creating a group that includes multiple game elements, wherein at least a first game element from the first set of game elements is added to the group,
    as part of the video game and based on determination that the group is incomplete, programmatically determining at least a second game element from the second set of game elements and add at least the second game element to the group to thereby complete the group; and
    wherein the computer application program is executed for the video game based on the user individually using each of the game elements included in the completed group.

2. The processing system according to claim 1, wherein, after at least the first game element is added and based on the determination that the group is incomplete, the group is automatically filled up with a number of game elements from the second set of game element that is equal to the number of game elements that can be added to the group.

3. The processing system according to claim 1, wherein, after at least the first game element is added and based on the determination that the group is incomplete, the group is automatically filled up with game elements from the second set of game elements according to a predetermined rule.

4. The processing system according to claim 3, wherein the game elements from the second set of game elements that are used to fill up the group are randomly selected from among the second set of game elements.

5. The processing system according to claim 1, wherein, based on the determination that the group is incomplete, the second game element is determined on the basis of a predetermined setting.

6. The processing system according to claim 5, wherein the predetermined setting is based on the video game.

7. The processing system according to claim 1, wherein the first game element is added to the group as a member of the group with a state of the first game element prior to the adding being maintained.

8. The processing system according to claim 1, wherein determination of the second game element is based on the second game element being available for selection by a second user of the video game.

9. The processing system according to claim 8, wherein an association between the user and the second user is stored and the selection of the second game element is based on the association between the user and the second user.

10. The processing system according to claim 9, wherein the second user includes a plurality of different users, each of which having a stored association to the user.

11. The processing system according to claim 1, wherein the at least one processor, singly or in co operation executing, changing a content setting such that a setting regarding the video game is changed and then at least the second game element is caused to appear in the video game via the executing computer application program.

12. The processing system according to claim 1, wherein the second game element is added to the group before the video game is started.

13. The processing system according to claim 1, wherein game elements that are included in the group are presented to the user before the video game is started.

14. The processing system according to claim 1, wherein the first game element is added to the group based on an input, provided by the user of the video game, selecting the first game element.

15. The processing system according to claim 1, wherein the second game element is determined without the user providing input to select any specific one of the second set of game elements, the second game element being automatically added to the group based on the determination.

16. The processing system according to claim 15, wherein:
at least two game elements, including the first game element, from the first set of game elements are added to the group based on inputs provided by the user of the video game,
multiple game elements, including the second game element, from the second set of game elements are added to the group, wherein the multiple game elements are currently available for selection by other users of the video game that are associated with the user.

17. The processing system according to claim 1, wherein the at least one processor changes a setting for the video game, in accordance with a setting of appearance order in which an order in which the game elements included in the group appear in the video game is set, and a combination of the game element that are caused to appear in the video game, such that the setting in the video game is advantageous for the user, and
the at least one processor, singly or in cooperation, executing determining whether a game element appearing in the video game has satisfied a leaving condition for leaving from the video game, and when the game element that has satisfied the leaving condition is caused to leave from the video game, wherein the game element included in the group is caused to appear in the video game according to the order.

18. A computer-readable non-transitory storage medium having stored therein an information processing program to be executed by a computer of a processing system, the information processing program causing the computer to:
execute a computer application program for a video game, wherein the video game includes a plurality of game elements for use during the video game, with a first set of game elements of the plurality of game elements being currently available for selection by a user of the video name and a second set of game elements of the plurality of came elements being not currently available for selection by the user of the video game;
as part of the video game, create a group that includes multiple game elements, wherein at least a first game element from the first set of game elements is added to the group;
as part of the video game and based on determination that the group is not complete, programmatically determine at least a second game element from the second set of game elements and add at least the second game element to the group to thereby complete the group; and
wherein the computer application program is executed for the video game based on the user individually using each of the game elements included in the completed group.

19. An information processing method executed by a computer that controls a processing system, the information processing method causing the computer to:
executing a computer application program for a video game, wherein the video game includes a plurality of game elements for use during the video game, with a first set of game elements of the plurality of game elements being unlocked for a user of the video game and a second set of game elements of the plurality of game elements being locked for the user of the video game;
as part of the video game, creating a group that includes multiple game elements, wherein at least a first game element from the first set of game elements is added to the group;
as part of the video game and based on determination that the group is incomplete, programmatically determining at least a second game element from the second set of game elements and add at least the second game element to the group to thereby complete the group; and
wherein the computer application program is executed for the video game based on the user individually using each of the game elements included in the completed group.

20. A computer system comprising:
an input device;
a processing system that includes memory and at least one hardware processor that is coupled to the input device, the processing system configured to:
execute a computer application program for a video game, wherein the video game includes a plurality of game elements for use during the video game, with a first set of game elements of the plurality of game elements being unlocked for a user of the video game and a second set of game elements of the plurality of game elements being locked for the user of the video game;
as part of the video game, create a group that includes multiple game elements, wherein at least a first game element from the first set of game elements is added to the group;
as part of the video game and based on determination that the group is incomplete, programmatically determine at least a second game element of the second set of game elements and add at least the second game to the group to thereby complete the group; and
wherein the computer application program is executed for the video game based on the user individually using each of the game elements included in the completed group.

* * * * *